(12) United States Patent
Lee

(10) Patent No.: US 11,954,150 B2
(45) Date of Patent: Apr. 9, 2024

(54) ELECTRONIC DEVICE AND METHOD FOR CONTROLLING THE ELECTRONIC DEVICE THEREOF

(71) Applicant: SAMSUNG ELECTRONICS CO., LTD., Suwon-si (KR)

(72) Inventor: Jungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/369,142

(22) Filed: Mar. 29, 2019

(65) Prior Publication Data

US 2019/0325224 A1    Oct. 24, 2019

(30) Foreign Application Priority Data

Apr. 20, 2018   (KR) .......................... 10-2018-0046072

(51) Int. Cl.
*G10L 15/22* (2006.01)
*G06F 16/33* (2019.01)
(Continued)

(52) U.S. Cl.
CPC .......... *G06F 16/73* (2019.01); *G06F 16/3329* (2019.01); *G06F 16/3344* (2019.01);
(Continued)

(58) Field of Classification Search
CPC ............... G06Q 30/02; G06K 9/00711; G06K 2009/00738; G06K 9/00342; G06K 9/00724; G06K 9/00671; G06K 9/00751; G06T 2207/30221; G06T 7/20; G06T 2207/10016; G06T 2207/30241; G06T 7/70; G06T 2207/20081; H04N 7/181;
(Continued)

(56) References Cited

U.S. PATENT DOCUMENTS 9,762,934 B2    9/2017  Son et al.
10,182,271 B1*  1/2019  Sanchez ............. H04N 21/4821
(Continued)

FOREIGN PATENT DOCUMENTS

CN    103870535 A    6/2014
CN    106162355 A   11/2016
(Continued)

OTHER PUBLICATIONS

Search machine translation: Voice Controlled Image Screen Display System of JP-H11305983-A to Tsukimi, retrieved Feb. 28, 2023, 12 pages. (Year: 2023).*

(Continued)

*Primary Examiner* — Matthew C Bella
*Assistant Examiner* — Dennis Rosario
(74) *Attorney, Agent, or Firm* — Sughrue Mion, PLLC

(57) ABSTRACT

An artificial intelligence (AI) system utilizing a machine learning algorithm such as deep learning for controlling an electronic device when a video is reproduced and a user's voice instruction is received, to acquire a frame corresponding to the time point when the input of the user's voice instruction is received, and obtain a search result for information on objects in the frame using an AI model trained according to at least one of machine learning, a neural network or a deep learning algorithm.

22 Claims, 19 Drawing Sheets

(51) Int. Cl.
| | |
|---|---|
| *G06F 16/332* | (2019.01) |
| *G06F 16/73* | (2019.01) |
| *G06F 16/738* | (2019.01) |
| *G06F 16/9032* | (2019.01) |
| *G06N 20/00* | (2019.01) |
| *G06V 10/22* | (2022.01) |
| *G06V 10/764* | (2022.01) |
| *G06V 10/82* | (2022.01) |
| *G06V 20/20* | (2022.01) |
| *G06V 20/40* | (2022.01) |
| *G10L 17/22* | (2013.01) |

(52) U.S. Cl.
CPC ...... *G06F 16/738* (2019.01); *G06F 16/90332* (2019.01); *G06N 20/00* (2019.01); *G06V 10/235* (2022.01); *G06V 10/764* (2022.01); *G06V 10/82* (2022.01); *G06V 20/20* (2022.01); *G06V 20/40* (2022.01); *G06V 20/41* (2022.01); *G10L 15/22* (2013.01); *G10L 17/22* (2013.01); *G10L 2015/223* (2013.01)

(58) Field of Classification Search
CPC ............. H04N 21/4532; H04N 21/812; H04N 21/482; H04N 21/2665; H04N 21/41407; H04N 21/2223; H04N 21/6125; H04N 21/4622; H04N 21/42203; H04N 21/4334; H04N 21/4722; H04N 21/4325; H04N 21/4394; G06F 3/167; G06F 3/0488; G06F 16/00; G06F 9/451; G06F 3/16; G06F 16/70; G06F 16/33; G06F 16/3329; G06F 40/20; G06F 40/00; G06F 16/90332; G06F 16/3344; G06F 16/632; G06F 16/63; G06F 16/732; G06F 16/7328; G06F 16/738; G06F 16/9032; G10L 15/22; G10L 2015/223; G10L 17/22; G10L 17/04; G10L 25/54; G06N 20/00; G06V 10/235

See application file for complete search history.

(56) References Cited

U.S. PATENT DOCUMENTS

| | | | |
|---|---|---|---|
| 10,614,120 | B2 | 4/2020 | Jin et al. |
| 11,314,804 | B2 | 4/2022 | Jin et al. |
| 2008/0295129 | A1* | 11/2008 | Laut ...................... G06Q 30/02 725/34 |
| 2012/0167144 | A1 | 6/2012 | Avison-Fell |
| 2014/0033050 | A1 | 1/2014 | Shin et al. |
| 2014/0172831 | A1 | 6/2014 | Jin et al. |
| 2014/0255003 | A1* | 9/2014 | Abramson .......... G06F 16/7834 386/240 |
| 2015/0296250 | A1* | 10/2015 | Casper ............... G06Q 30/0623 725/34 |
| 2015/0347461 | A1 | 12/2015 | Moon et al. |
| 2016/0127750 | A1 | 5/2016 | Son et al. |
| 2016/0170710 | A1* | 6/2016 | Kim ........................ G06F 3/013 704/275 |
| 2016/0259854 | A1 | 9/2016 | Liu et al. |
| 2017/0046369 | A9 | 2/2017 | Boncyk et al. |
| 2018/0005047 | A1 | 1/2018 | Yu et al. |
| 2018/0220189 | A1* | 8/2018 | Hodge ............... G06K 9/00771 |
| 2019/0027147 | A1* | 1/2019 | Diamant ............. G06F 16/3329 |
| 2019/0102667 | A1* | 4/2019 | Bashkirov ............. G06N 3/004 |
| 2019/0244270 | A1 | 8/2019 | Kim et al. |
| 2020/0201901 | A1 | 6/2020 | Jin et al. |

FOREIGN PATENT DOCUMENTS

| | | | |
|---|---|---|---|
| JP | H11305983 | A * | 11/1999 |
| KR | 10-2007-0002161 | A | 1/2007 |
| KR | 10-0958302 | B1 | 5/2010 |
| KR | 10-1022285 | B1 | 3/2011 |
| KR | 10-2014-0067792 | A | 6/2014 |
| KR | 10-2015-0136312 | A | 12/2015 |
| KR | 10-2016-0031226 | A | 3/2016 |
| KR | 10-2016-0052316 | A | 5/2016 |
| WO | 2007/004814 | A1 | 1/2007 |
| WO | 2017/166098 | A1 | 10/2017 |
| WO | 2018/043990 | A1 | 3/2018 |
| WO | WO-2019030551 | A1 * | 2/2019 |

OTHER PUBLICATIONS

Communication dated Jun. 19, 2020 issued by the European Patent Office in European Application No. 19169593.1.
International Search Report (PCT/ISA/210) dated Jul. 12, 2019 issued by the International Searching Authority in counterpart International Application No. PCT/KR2019/004173.
Written Opinion (PCT/ISA/237) dated Jul. 12, 2019 issued by the International Searching Authority in counterpart International Application No. PCT/KR2019/004173.
Communication dated Aug. 29, 2019 issued by the European Patent Office in counterpart European Application No. 19169593.1.
Communication dated Dec. 14, 2020, issued by Intellectual Property India in Indian Patent Application No. 201944013220.
Communication dated Mar. 5, 2021 issued by the European Patent Office in European Application No. 19169593.1.
Communication dated Feb. 9, 2022 by the European Patent Office in European Patent Application No. 19169593.1.
Communication dated Feb. 18, 2022 by the European Patent Office in European Patent Application No. 19169593.1.
Communication dated Oct. 21, 2022, issued by the National Intellectual Property Administration of P.R. China in Chinese Patent Application No. 201910298649.9.
Communication dated Jul. 12, 2022 by the European Patent Office in European Patent Application No. 22168571.2.
Communication dated Jul. 15, 2022 by the Korean Intellectual Property Office in Korean Patent Application No. 10-2018-0046072.
Office Action dated Apr. 20, 2023, issued by the China National Intellectual Property Administration in Chinese Patent Application No. 201910298649.9.
Communication dated Aug. 8, 2023 by the Chinese National Intellectual Property Administration in Chinese Patent Application No. 201910298649.9.
Office Action dated Nov. 23, 2023, issued by the China National Intellectual Property Administration in Chinese Patent Application No. 201910298649.9.
Communication dated Nov. 27, 2023, issued by the European Patent Office in European Patent Application No. 22168571.2.

* cited by examiner

FIG. 1
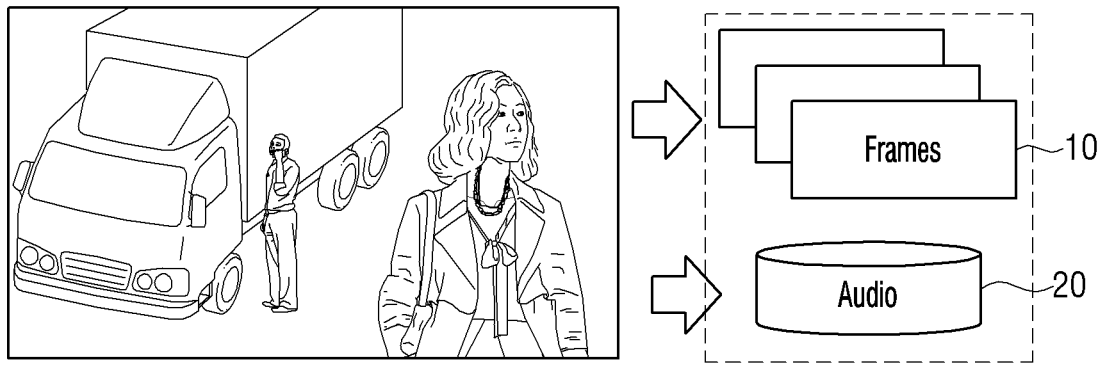
(a)
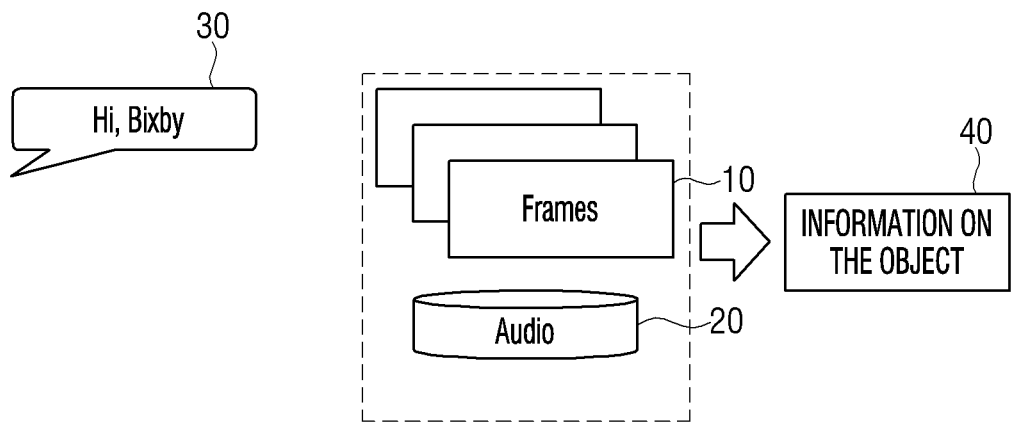
(b)
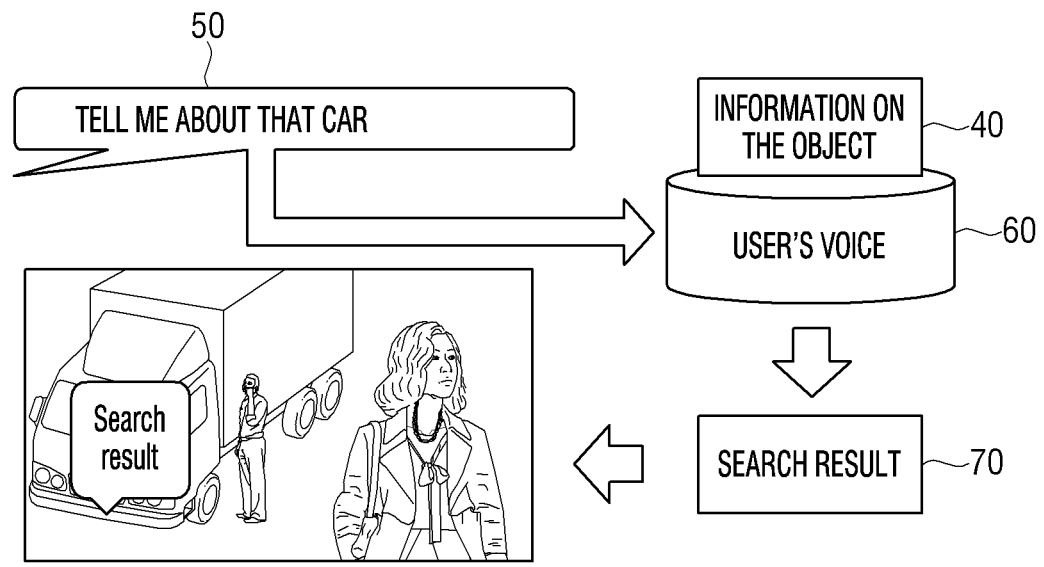
(c)

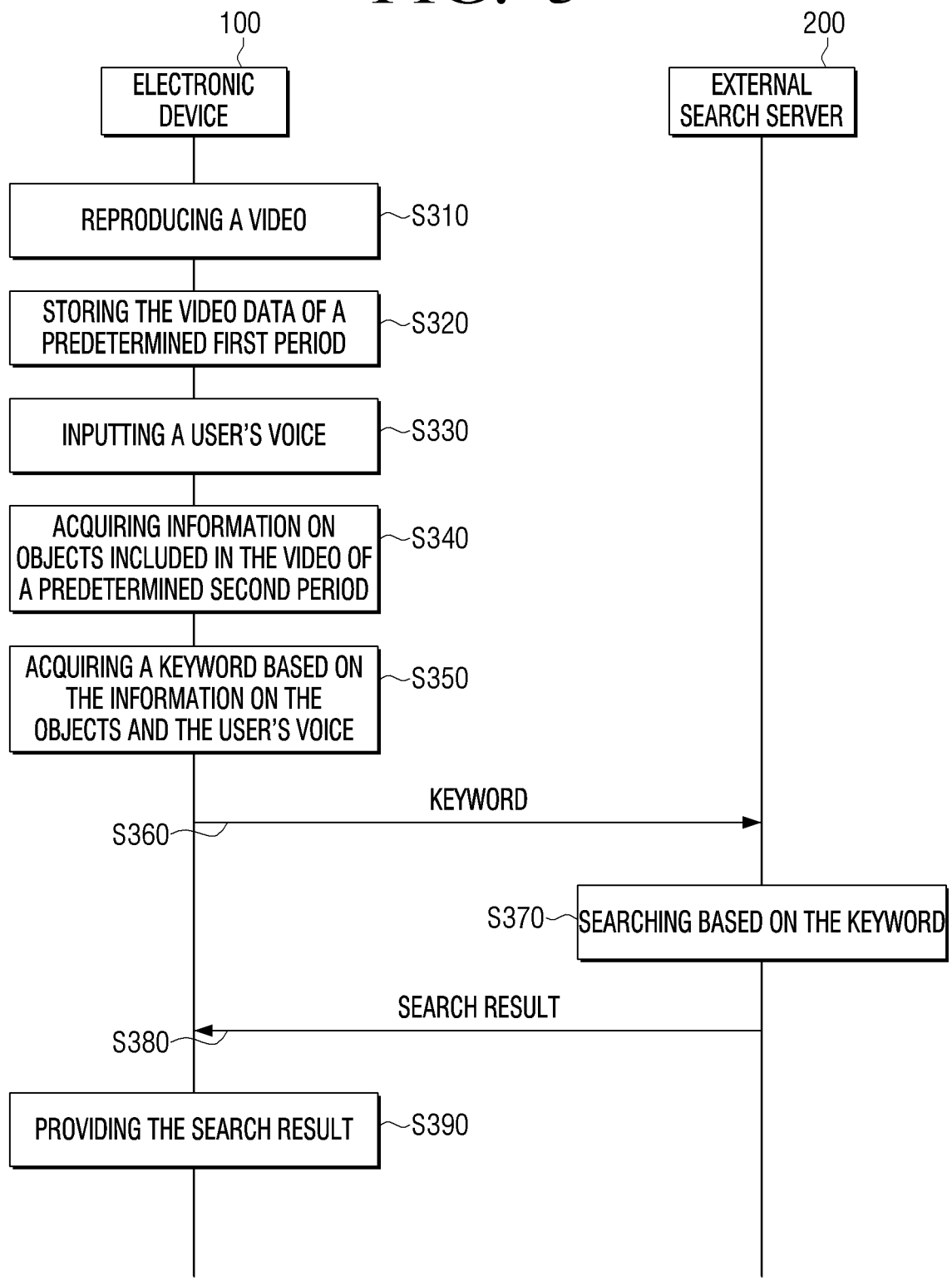

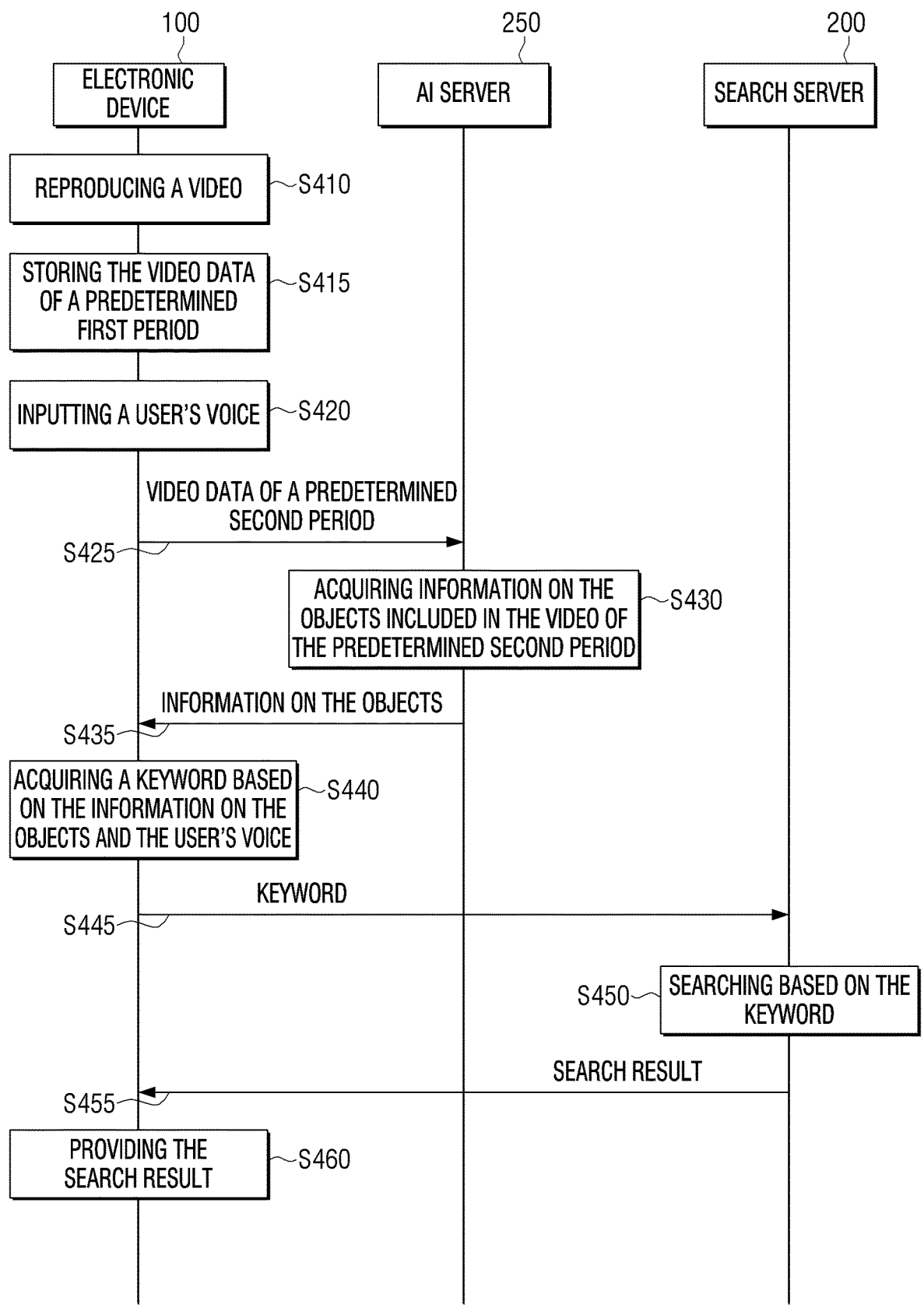

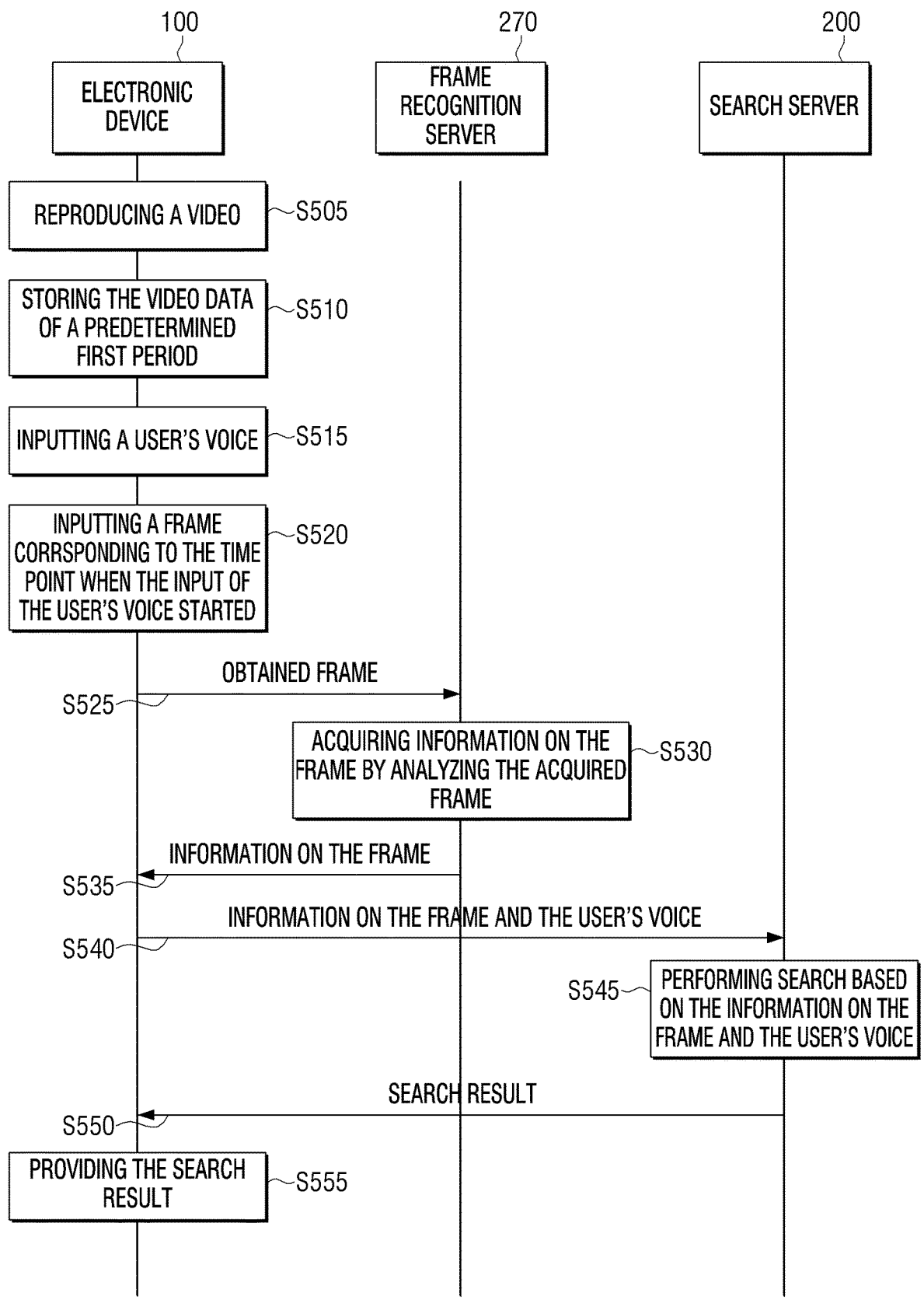

FIG. 6
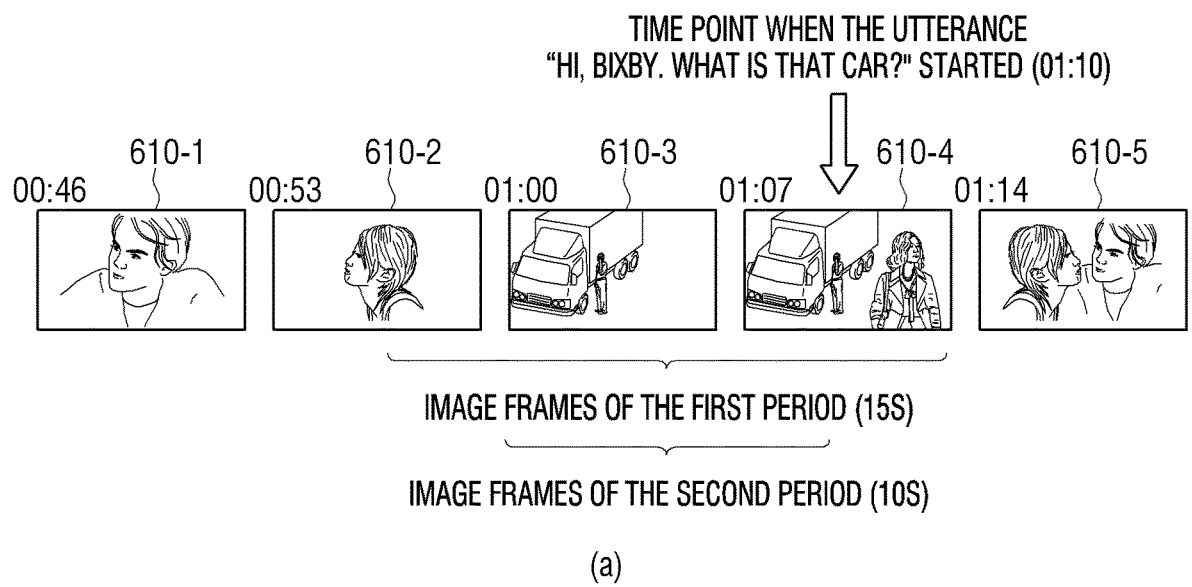
(a)
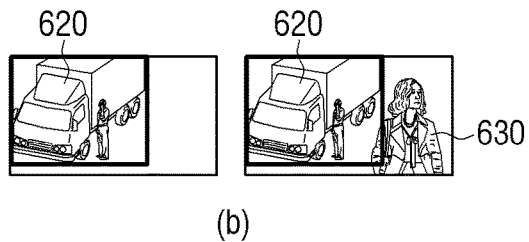
(b)
2017 XX TRUCK
FACTORY PRICE     14.94 MILLION KRW~
                             20.43 MILLION KRW
SECOND HAND PRICE   NO INFORMATION
FUEL EFFICIENCY    6.4~9.6 KM/L
FUEL                  DIESEL, LPG
SALES                DOMESTIC LAUNCH
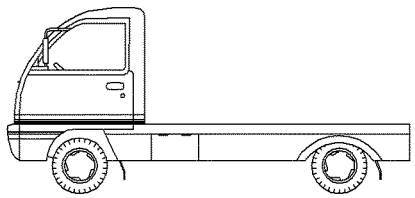
(c)

FIG. 7
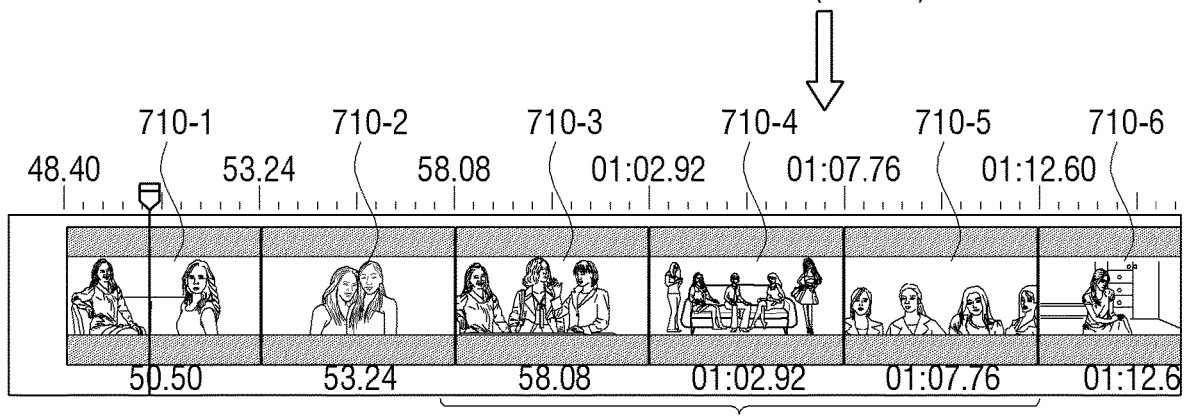
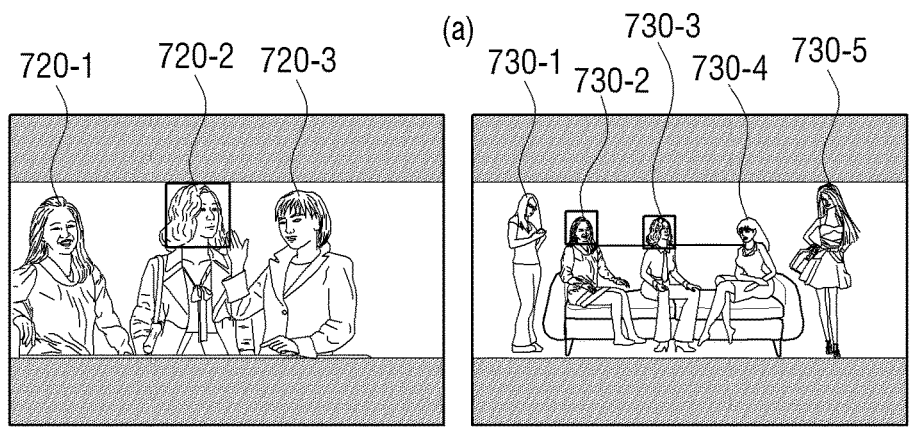
(b)
NAME: &&&
AGE: %%
JOB: MOVIE ACTRESS
REPRESENTATIVE WORK: ~~~
(c)

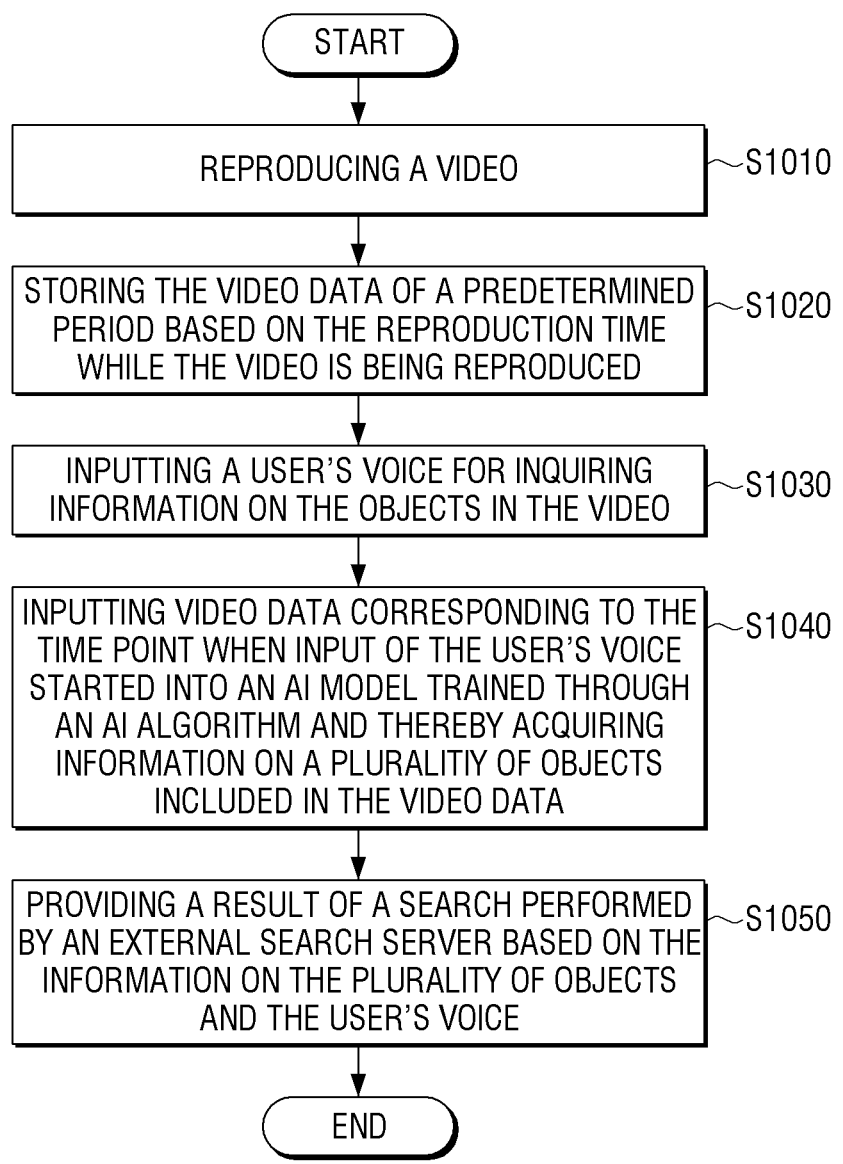

ELECTRONIC DEVICE AND METHOD FOR CONTROLLING THE ELECTRONIC DEVICE THEREOF

CROSS-REFERENCE TO RELATED APPLICATION(S)

This application is based on and claims priority under 35 U.S.C. § 119(a) from Korean Patent Application No. 10-2018-0046072, filed on Apr. 20, 2018, in the Korean Intellectual Property Office, the disclosure of which is incorporated by reference herein in its entirety.

BACKGROUND

1. Field

The disclosure relates to an electronic device and a controlling method thereof, and more particularly, to an electronic device which enables searching for information about objects included in an image by using a user's voice while viewing the image.

Also, the disclosure relates to an artificial intelligence (AI) system that simulates functions of a human brain, such as cognition and determination by using a machine learning algorithm, and application thereof for searching for information about objects included in an image by using a user's voice while the user views the image.

2. Description of Related Art

Recently, artificial intelligence systems implementing intelligence of a human level are used in various fields. An artificial intelligence system refers to a system in which a machine learns, determines, and becomes smarter, unlike conventional rule-based smart systems. An artificial intelligence system shows a more improved recognition rate as iterations are performed, and becomes capable of more accurately understanding user preference. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Meanwhile, users may be provided various contents using various devices. In particular, there are cases that users want to search for information about objects included in content while the content is being reproduced. For example, there are cases that users want to search for the clothes worn by the main character of a soap opera, or the car driven by the main character in a movie.

In the past, in case a user wants to search information on objects included in a content while the content is being reproduced, there was limitation that the user would use an external device, or stop the reproduction of the content that was being reproduced to search for information on the object in the content.

SUMMARY

The disclosure provides an electronic device that enables searching for information about objects included in a content that is currently being reproduced, by using a user's voice, and a controlling method thereof.

A method for controlling an electronic device according to an embodiment of the disclosure includes the steps of: storing a plurality of frames of the reproduced video for a specific time period while reproducing the video; receiving input of a user's voice instruction while reproducing the video; acquiring a frame from among the stored plurality of frames corresponding to a time point when the input of the user's voice instruction is received; and providing a search result for information about a plurality of objects included in the frame based on information on the acquired frame and information on the input of the user's voice instruction.

An electronic device according to an embodiment of the disclosure includes: a display; a communicator; a microphone; memory storing at least one instruction; and a processor connecting the display, the communicator, the microphone and the memory, and controlling the electronic device. The processor controls the electronic device to store in the memory a plurality of frames of reproduced video for a specific time period while reproducing the video by executing the at least one instruction, and acquires, based on receiving input of a user's voice instruction while the video is being reproduced, a frame from among the stored plurality of frames corresponding to a time point when the input of the user's voice instruction is received, and provides a search result for information about a plurality of objects included in the frame based on information on the acquired frame and information on the input of the user's voice instruction.

According to an embodiment of the disclosure as described above, a user becomes capable of searching information on an image content that the user is currently viewing more easily and intuitively through his or her voice, without stopping the reproduction of the image content.

BRIEF DESCRIPTION OF THE DRAWINGS

FIG. 1 is a usage diagram for illustrating an electronic device for providing information about objects included in a video while the video is being reproduced, according to an embodiment of the disclosure;

FIG. 3 is a flow chart for illustrating a method for providing information on objects included in a video while the video is being reproduced, according to an embodiment of the disclosure;

FIG. 4 is a flow chart for illustrating a method for providing information about objects included in a video while the video is being reproduced, according to an embodiment of the disclosure;

FIG. 5 is a flow chart for illustrating a method for providing information about objects included in a video while the video is being reproduced, according to an embodiment of the disclosure;

FIG. 6 is a diagram for illustrating a method for providing information about objects included in a video while the video is being reproduced, according to an embodiment of the disclosure;

FIG. 7 is a diagram for illustrating a method for providing information about objects included in a video while the video is being reproduced, according to an embodiment of the disclosure;

FIG. 10 is a flow chart for illustrating a method for controlling an electronic device according to an embodiment of the disclosure;

DETAILED DESCRIPTION

Figure 2A:
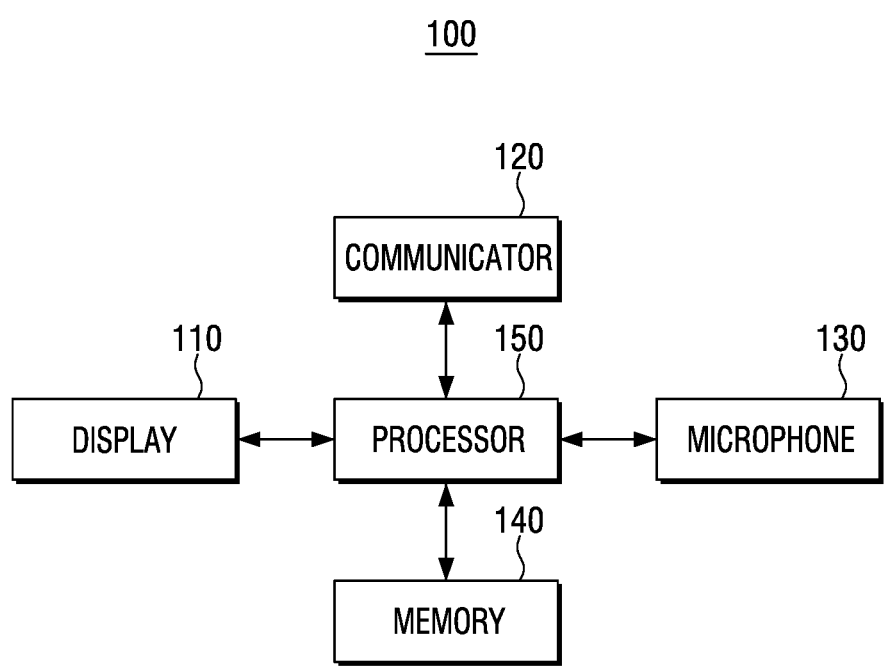
FIG. 2A is a diagram for schematically illustrating the constitution of an electronic device according to an embodiment of the disclosure.

Hereinafter, various embodiments of the disclosure will be described with reference to the accompanying drawings.

However, it should be noted that the various embodiments are not for limiting the technologies described in the disclosure to a specific embodiment, but should be interpreted to include all modifications, equivalents and/or alternatives of the embodiments of the disclosure. Meanwhile, with respect to the detailed description of the drawings, similar components may be designated by similar reference numerals.

In the disclosure, terms such as "have," "may have," "include" and "may include" should be construed as denoting that there are such characteristics (e.g., elements such as numerical values, functions, operations and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B" or "at least one of A or B" refer to all of the following cases: (1) including at least one A, (2) including at least one B or (3) including at least one A and at least one B.

Further, the expressions "first," "second" and the like used in the disclosure may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Further, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device when such programs are loaded into memory and executed by the processor.

An electronic device according to various embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, or a wearable device. Meanwhile, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit. Also, in some embodiments, an electronic device may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In another embodiment of the disclosure, an electronic device may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, etc.).

Meanwhile, in the disclosure, the term "a user" may refer to a person using an electronic device or a device using an electronic device (e.g., an AI electronic device).

FIG. 1 is a usage diagram for illustrating an electronic device for providing information about objects included in a video while the video is being reproduced, according to an embodiment of the disclosure.

First, as illustrated in (a) of FIG. 1, the electronic device (100) may reproduce a video. The electronic device (100) may be the electronic device (100) of FIG. 2A. Here, the video may include a plurality of image frames (10) and audio (20), and in each of the plurality of image frames (10), objects may be included.

In particular, the electronic device (100) may store frames that were reproduced for a specific time period while the video is being reproduced. To be specific, the electronic device (100) may store the video data (e.g. image frames (10) and audio frames (20)) of a predetermined first period based on the current reproduction time while the video is being reproduced. For example, the electronic device (100) may store or buffer frames in the interval of 15 seconds before and after the current reproduction time. Here, the electronic device (100) may store all image frames of a predetermined first period, but this is merely an example, and the electronic device (100) may compare similarity of a plurality of image frames, and store only representative frames among the plurality of image frames. That is, the electronic device (100) may store only some image frames with respect to a still image. Alternatively, the electronic device (100) may store thumbnail images of a plurality of image frames. Also, the electronic device (100) may store audio frames (20) together with a plurality of image frames (10) of a predetermined first period. In particular, the electronic device (100) may match audio frames (20) corresponding to a plurality of image frames (10) of a predetermined first period, and store the matched frames. That is, the electronic device (100) may store audio frames, starting from an audio frame of a time period corresponding to the earliest image frame among the stored image frames (10). Meanwhile, if it is determined that audio frames (20) do not include any audio or audio of a user's voice, the electronic device (100) may not store the audio frames (20).

Further, the electronic device (100) may temporarily store or buffer image frames (10) and audio frames (20) of a predetermined first period. That is, the electronic device (100) may store image frames (10) and audio frames (20) of a predetermined first period by a first-in first-out (FIFO) method. Meanwhile, the electronic device (100) may temporarily store or buffer image frames and audio frames of some periods in the case of downloading a portion of a video by a streaming method and reproducing the portion, and in the case of receiving a video in real time and reproducing the video. However, this is merely an example, and the electronic device (100) may store all image frames and audio frames included in a video in case the video is a video that was downloaded from an external source before reproducing the downloaded content.

While the electronic device (100) is reproducing a video, the electronic device (100) may receive input of a user's voice instruction for inquiring information on objects included in the video. Here, the user's voice instruction may include a trigger command for initiating an inquiry on information on the objects included in a frame and an inquiry command inquiring information on the objects. For example, the electronic device (100) may include a trigger command (30) "Hi, Bixby," which is for initiating an inquiry on information, and an inquiry command (50) "Tell me about that car." Also, the user's voice may be converted into text through a speech to text (STT) module executed internally by the electronic device (100) or executed externally by another device or server processing the inquiry command.

In particular, the electronic device (100) may acquire a frame corresponding to the time point when the input of the user's voice instruction is received, among the stored frames. Here, the electronic device (100) may acquire a frame corresponding to the time point when the input of the user's voice instruction started and also a frame of a predetermined second period from the frame corresponding to the time point when the input of the user's voice instruction started.

Then, the electronic device (100) may acquire information on frames from the acquired frames or the frames of the second period. To be specific, as illustrated in (b) of FIG. 1, in case a trigger voice (30) "Hi, Bixby" is received, the electronic device (100) may acquire image frames and audio frames of a predetermined second period (e.g., 5 seconds) from the time point when the trigger voice (30) "Hi, Bixby" was input. Then, the electronic device (100) may acquire information (40) on a plurality of objects included in the video data from the image frames and the audio frames of the predetermined second period. Here, the predetermined second period may be different from the predetermined first period. However, this is merely an example, and the periods may be the same.

In particular, the electronic device (100) may acquire information (40) on a plurality of objects included in the video data by inputting the image frames and the audio frames of the predetermined second period into an artificial intelligence (AI) model trained through an AI algorithm. Here, the AI model may be a model trained to acquire information (40) on objects included in a video by using video data (image frames and audio frames) as input data.

Also, the information (40) on objects may include information on the types of objects, information on the names of objects, information on the sizes of objects, information on the movements of objects, information on the relation between an object and another object, etc., but these are merely examples, and other kinds of information may also be acquired. Also, the information (40) on objects may be in the form of text including at least one word, but this is merely an example, and the information may be the image of the object itself included in an image frame. Further, the electronic device (100) may match the information (40) on a plurality of objects with the image frame wherein the plurality of objects appeared, and store the information and the frame.

Meanwhile, an AI model may be included in an electronic device, but this is merely an example, and an AI model may also be included in an external server. In case an AI model is included in an external server, the electronic device (100) may transmit the video data of a predetermined second period to the external server, and acquire information (40) on the objects included in the video in the predetermined second period from the external server. Also, in addition to the video data, information on the user such as information on the user's search, history of the user and information on the user's preference may be used as input data that is inputted into an AI model.

Further, in the example described above, information (40) on the objects included in the video in the predetermined second period may be acquired after a trigger voice (30) is input, but this is merely an example, and information (40) on the objects included in the video in the predetermined first period may be acquired before a trigger voice (30) is input.

The electronic device (100) may provide a search result (70) performed by an external server based on information on a plurality of objects and a user's voice, as illustrated in (c) of FIG. 1.

To be specific, the electronic device (100) may perform voice recognition (60) of an inquiry voice (50), among a user's voices. Also, the electronic device (100) may determine information on an object corresponding to a user's voice (in particular, an inquiry voice) (60) that was recognized, among the information (40) on a plurality of objects. For example, the electronic device (100) may acquire information on a first person, information on a second person, information on an animal and information on a truck, as information on a plurality of objects, and if the recognized inquiry voice (60) is "Tell me about that car," the electronic device (100) may determine "information on a truck" as a keyword for search among the information on a plurality of objects. Here, the electronic device (100) may provide a UI identifying whether information on an object is information on an object corresponding to the user's voice among the information on a plurality of objects, or identifying whether there is an additional inquiry for inquiring additional information.

According to another embodiment of the disclosure, the electronic device (100) may acquire a keyword for search by using an AI model trained to acquire a keyword for search by inputting information on objects and a user's voice (i.e., text corresponding to a user's voice).

The electronic device (100) may acquire a keyword for search by using information on objects and a user's voice and also information on a content that was acquired.

Also, the electronic device (100) may transmit the determined information on an object to an external search server as a keyword for search, and receive a search result (70) from the external search server and provide the result to the user. To be specific, the electronic device (100) may provide the search result (70) in an area of a video while the video is being reproduced. For example, the electronic device (100) may provide a search result (70) in the form of a speech bubble, as illustrated in (c) of FIG. 1. That is, the electronic device (100) may provide a search result through an area overlaid on the video, without stopping reproduction of the video. Also, the electronic device (100) may pause the video that is currently being reproduced, and then provide a UI including a search result. Here, the electronic device (100) may provide a search result and an image frame corresponding to the search result together with the video data. Also, the electronic device (100) may transmit information on the content along with a keyword to an external search server, and may receive a search result (70) from the external search server and provide the result.

According to still another embodiment of the disclosure, the electronic device (100) may analyze a stored image frame, and thereby acquire information on the image frame (e.g., the name of the video content, the reproduction time of the video content, the type of the video content, the objects included in the video content, etc.). To be specific, the electronic device (100) may analyze a fingerprint included in an image frame, and thereby acquire information on the frame. Here, the fingerprint refers to feature data showing the features of the image frame, and is also referred to as fingerprint data, DNA data or genetic data. In particular, information related to fingerprints is recently used widely in fields such as the field of digital rights management (DRM) for determining identity of data. Further, the electronic device (100) may analyze symbols (e.g., a channel log, a channel number, etc.) included in a specific area of an image frame, and thereby acquire information on the frame. In addition, the electronic device (100) may acquire information on a frame that is currently being reproduced based on EPG data.

Meanwhile, in the embodiment described above, the electronic device (100) analyzes an image frame, and thereby acquires information on the frame. However, this is merely an example, and the electronic device (100) may also acquire information on a frame by using an external server. That is, the electronic device (100) may transmit a stored image frame to an external server for recognition of frames, and the external server may acquire information on the frame by acquiring the fingerprint of the image frame, analyzing the symbols included in the image frame, or analyzing the objects included in the image frame. Then, the external server may transmit the acquired information on the frame to the electronic device (100). In particular, in case a user's voice for inquiring information on an object in a video is input, the electronic device (100) may analyze the image frame and thereby acquire information on the content. However, this is merely an example, and the electronic device (100) may analyze an image frame while reproducing the image frame, and thereby acquire information on the frame.

Further, the electronic device (100) may transmit the acquired information on the frame and the information on the user's voice instruction to an external search server. Then, the electronic device (100) may receive a search result (70) from the external search server, and provide the result.

Meanwhile, according to the various embodiments of the disclosure, a trained AI model may also be used to acquire information (40) on objects. Here, the electronic device (100) may include each of an AI model for acquiring information (40) on objects from an image frame among the video data, and an AI learning model for acquiring information (40) on objects from an audio frame among the video data. That is, the electronic device (100) may input an image frame among the video data into an AI model and acquire information (40) on objects included in the image frame. Also, the electronic device (100) may input an audio frame among the video data into an AI model and acquire information (40) on objects included in the audio frame. Further, the electronic device (100) may acquire a keyword for search by using an AI model trained to acquire a keyword for search by inputting information on objects and a user's voice.

A trained AI model according to the disclosure may be constructed in consideration of the field to which a recognition model will be applied, or the computer performance of a device, and the like. For example, an AI model may be trained to acquire information on objects included in a video by inputting video data. A trained AI model may be, for example, a model based on a neural network. A recognition model may be designed to simulate a human brain structure on a computer, and may include a plurality of network nodes having weights, which simulate neurons of a human neural network. The plurality of network nodes may respectively form a relation of connection, to simulate synaptic activities of neurons wherein neurons give and receive signals through synapses. Here, an AI model may be a deep neural network (DNN), but this is merely an example, and a different AI model may be used.

Meanwhile, the electronic device (100) may use an AI agent to search for information related to objects as described above. Here, an AI gent is a dedicated program for providing AI based services (e.g., a voice recognition service, an assistance service, a translation service, a search service, etc.), and may be executed by a conventional generic-purpose processor (e.g., a CPU) or a separate AI-dedicated processor (e.g., a GPU, etc.).

To be specific, in case a user's voice is input after a predetermined trigger voice was input or a button provided on the electronic device (100) (e.g., a button for executing an AI agent) was activated, the AI agent may operate. Also, the AI agent may acquire information on objects included while a video is being reproduced, based on the user's voice.

Obviously, if a user's voice is input after a predetermined trigger voice was input or a button provided on the electronic device (100) (e.g., a button for executing an AI agent) was pressed, the AI agent may operate. Alternatively, the AI agent may already have been executed before a user's voice is input after a predetermined trigger voice was input or a button or other switch provided on the electronic device (100) (e.g., a button for executing an AI agent) was activated. In such a case, after a user's voice is input after a predetermined trigger voice was input or a button provided on the electronic device (100) (e.g., a button for executing an AI agent) was activated, the AI agent of the electronic device (100) may perform a function of searching information related to objects. Also, the AI agent may be in a standby state before a user's voice is input after a predetermined trigger voice was input or a button provided on the electronic device (100) (e.g., a button for executing an AI agent) was pressed. Here, a standby state refers to a state wherein receipt of a predefined user input is detected, for control of the operation time of the AI agent. While the AI agent is in a standby state, if a user's voice is input after a predetermined trigger voice was input or a button provided on the electronic device (100) (e.g., a button for executing an AI agent) was pressed, the electronic device (100) may operate the AI agent, and search for information related to objects according to a user's voice, and provide the resultant information.

Figure 2B:
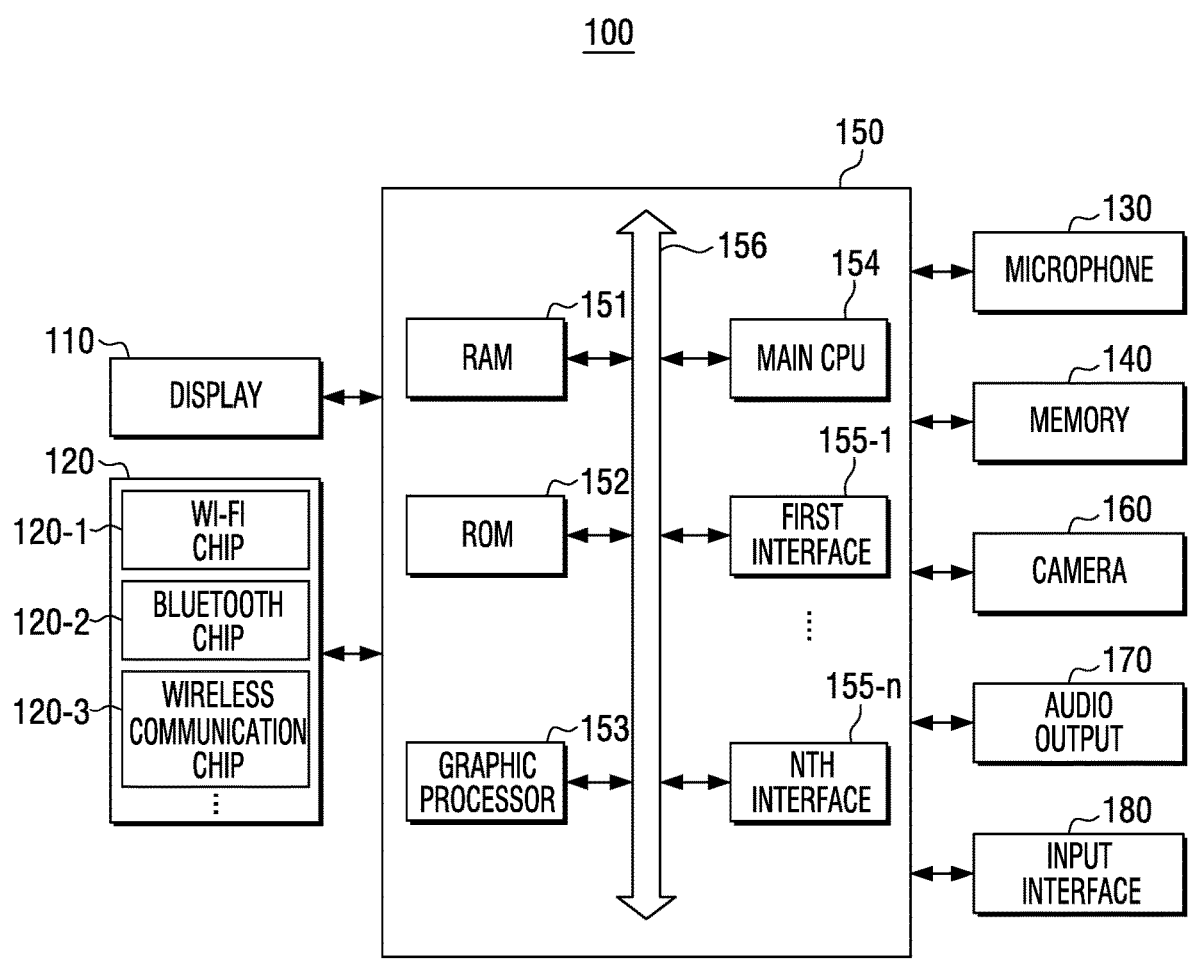
FIG. 2B is a diagram for illustrating the detailed constitution of an electronic device according to an embodiment of the disclosure.

FIGS. 2A and 2B are block diagrams for illustrating the constitution of an electronic device according to an embodiment of the disclosure. As illustrated in FIG. 2A, the electronic device (100) may include a display (110), a communicator (120), a microphone (130), memory (140) and a processor (150). The elements illustrated in FIG. 2A are exemplary hardware for implementing the embodiments of the disclosure, and appropriate hardware/software elements known to those skilled in the art may be additionally added to the electronic device (100).

The display (110) may provide various screens. In particular, the display (110) may reproduce a video. Here, a video may include a plurality of various objects. Also, the display (110) may display a UI identifying whether information on an object is information on an object corresponding to a user's voice among the information on a plurality of objects, or identifying whether there is an additional inquiry to obtain additional information. Further, the display (110) may display a search result.

The communicator (120) may perform communication with an external device through various communication methods. In particular, the communicator (120) may transmit a query generated based on a keyword to an external search server, and receive a search result which is a response to the query from the external search server. Meanwhile, in case an AI model is stored in a separate sever, the communicator (120) may perform communication with the AI server, and thereby acquire information on objects.

The microphone (130) is an element for receiving input of a user's voice, and may be provided inside the electronic device (100). However, this is merely an example, and the microphone (130) may be provided external to the electronic device (100), and may be electrically or wirelessly connected to the electronic device (100). In particular, the microphone (130) may be provided on a separate remote controller for controlling the electronic device (100), and the remote controller may be provided to execute an AI agent.

The memory (140) may store commands or data related to at least one other element of the electronic device (100). In particular, the memory (140) may be implemented as non-volatile memory, volatile memory, flash-memory, a hard disk drive (HDD) or a solid state drive (SSD), and the like. In addition, the memory (140) may be accessed by the processor (150), and reading/recording/correction/deletion/update, etc. of data by the processor (150) may be performed. In the disclosure, the term memory may include memory (140), ROM inside the processor (150), RAM or a memory card installed on the electronic device (100) (e.g., a micro SD card, a memory stick). Also, in the memory (140), programs, data, etc. for constituting various screens to be displayed in the display area of the display (110) may be stored.

In particular, the memory (140) may store programs for executing an AI agent. Here, the AI agent is a personalized program for providing various services with respect to the electronic device (100). In addition, the memory (140) may store an AI model for acquiring information on objects from the video data. Further, the memory (140) may store an AI model trained to acquire a keyword for search by inputting information on objects and a user's voice.

Also, the memory (140) may be implemented as volatile memory, for temporarily storing the video data of a predetermined first period.

Meanwhile, the processor (150) may be electrically connected to the display (110), the communicator (120), the microphone (130) and the memory (140), and may control the overall operations and functions of the electronic device (100). In particular, the processor (150) may store frames reproduced for a specific time period while the video is being reproduced in the memory (140) by executing at least one instruction stored in the memory (140), and acquire, based on receiving input of a user's voice instruction while the video is being reproduced, a frame corresponding to the time point when the input of the user's voice instruction is received, among the stored frames, and provide a search result performed by an external search server based on information on the acquired frame and information on the user's voice instruction.

In particular, the processor (150) according to an embodiment of the disclosure may store the video data of a predetermined period based on the reproduction time while the video is being reproduced in the memory (140), and based on receiving input of a user's voice for inquiring information on an object in the video through the microphone (130), input the video data corresponding to the time point when the input of the user's voice started into an AI model trained through an AI algorithm, and thereby acquire information on a plurality of objects included in the video data, and control the display (110) to provide a search result performed by an external search server based on information on the plurality of objects and the user's voice.

To be specific, the processor (150) may store the video data of a predetermined period based on the reproduction time while the video is being reproduced. Here, the video data may include image frames and audio frames, and the processor (150) may match the image frames and the audio frames and store the frames in the memory (140).

Also, the processor (150) may receive a user's voice input through the microphone (130). Here, the user's voice may include a trigger voice for initiating an inquiry on information on objects and an inquiry voice inquiring for information on the objects. In particular, the processor (150) may input the video data of a predetermined period based on the time point when the trigger voice was input into an AI model, and thereby acquire information on a plurality of objects included in the video data. That is, the processor (150) may input at least one of the image frames or the audio frames into an AI model, and thereby acquire information on a plurality of objects included in the video. Here, the processor (150) may match information on a plurality of objects within the image frame in which the plurality of objects appear, and store the information and the frames in the memory (140).

In addition, the processor (150) may determine information on an object corresponding to the user's voice among the information on a plurality of objects. To be specific, the processor (150) may acquire information on an object that is identical to the keyword included in the user's voice (in particular, an inquiry voice) among the information on a plurality of objects included in the video. Here, the processor (150) may control the display (110) to display a UI identifying whether information on an object is information on an object corresponding to the user's voice among the information on a plurality of objects, or identifying whether there is an additional inquiry to obtain additional information.

Further, the processor (150) may control the communicator (120) to transmit the determined information on an object to an external search server as a keyword for search. Also, the processor (150) may receive a search result which is a response to the query from the external search server through the communicator (120), and control the display (110) to provide the received search result. Here, the processor (150) may control the display (110) to provide the search result in an area of the video while the video is being reproduced. Also, the processor (150) may control the display (110) to provide the search result together with an image frame corresponding to the search result.

According to another embodiment of the disclosure, the processor (150) may acquire a frame corresponding to the time point when the input of a user's voice started. To be specific, the processor (150) may acquire a frame corresponding to the time point when a trigger voice among a user's voices was received. Then, the processor (150) may control the communicator (120) to transmit the acquired frame to an external frame recognition server (270).

Further, the processor (150) may receive information on the frame acquired by the frame recognition server through the communicator (120).

The processor (150) may transmit information on the frame and the user's voice to a search server (200). Then, the processor (150) may receive a search result from the search server (200), and provide the result to the user.

Meanwhile, the processor (150) may generate a keyword based on the information on the frame and the user's voice, and control the communicator (120) to transmit the generated keyword to an external search server (200). Here, the processor (150) may acquire a keyword by inputting the information on the frame and the user's voice into a trained AI model.

FIG. 2B is a block diagram for illustrating the detailed constitution of the electronic device (100) according to an embodiment of the disclosure. As illustrated in FIG. 2B, the electronic device (100) may include a display (110), a communicator (120), a microphone (130), memory (140), a processor (150), a camera (160), an audio output (170) and an input interface (180). Meanwhile, as the display (110), the microphone (130) and the memory (140) were described with respect to FIG. 2A, redundant descriptions thereof will be omitted.

The communicator (120) may perform communication with various types of external devices according to various types of communication methods. The communicator (120) may be a communication interface and may include at least one of a Wi-Fi chip (120-1), a Bluetooth chip (120-2) or a wireless communication chip (120-3). Meanwhile, the processor (150) may perform communication with an external server or various types of external devices through the communicator (120). Further, the communicator (120) may perform communication with external devices through various communication chips, such as an near field communication (NFC) chip.

The camera (160) may photograph a video including at least one object. Here, the camera (160) may be provided on at least one of the front part or the rear part of the electronic device (100). Meanwhile, the camera (160) may be provided inside the electronic device (100), but this is merely an example, and the camera (160) may exist outside the electronic device (100), and may be wired or wirelessly connected with the electronic device (100).

The audio output (170) is an element that audibly outputs various types of alarming sounds or voice messages, as well as various types of audio data for which diverse types of processing such as decoding or amplification, noise filtering, and the like have been performed by an audio processor. In particular, the audio output (170) may be implemented as a speaker, but this is merely an example, and may be implemented as an output terminal or other connection interface that can output audio data.

The input interface (180) may receive various user inputs, and transmit the inputs to the processor (150). In particular, the input interface (180) may include a touch sensor, a (digital) pen sensor, a pressure sensor, a key or a microphone. For the touch sensor, for example, at least one method from a capacitive method, a decompressive method, an infrared method or an ultrasonic method may be used. The (digital) pen sensor may be a part of a touch panel, or include a separate sheet for recognition. The key may include, for example, a physical button, an optical key or a keypad.

In particular, the input interface (180) may acquire an input signal according to a user's instruction input through a UI. Then, the input interface (180) may transmit the input signal to the processor (150). The input interface (180) may referred to as a user input interface.

The processor (150) (or, the controller) may control the overall operations of the electronic device (100) by executing various programs stored in and loaded from the memory (140).

Also, the processor (150) may consist of RAM (151), ROM (152), a graphic processor (153), a main CPU (154), first to nth interfaces (155-1155-n) and a bus (156). Here, the RAM (151), the ROM (152), the graphic processor (153), the main CPU (154), the first to nth interfaces (155-1155-n), and the like may be connected to one another through the bus (156).

Hereinafter, the various embodiments of the disclosure will be described with reference to the drawings.

FIG. 3 is a flow chart for illustrating a method for controlling an electronic device for searching information on objects according to an embodiment of the disclosure.

First, the electronic device (100) may reproduce a video (S310). Here, the reproduced video may be a video received by a streaming method, but this is merely an example, and the video may be a video that has been completely downloaded before the video was reproduced.

The electronic device (100) may store or buffer the video data of a predetermined first period while the video is being reproduced (S320). Here, the video data of a predetermined first period may include the image frames and the audio frames of the first period, but this is merely an example, and the video data may include the metadata, etc. of the video. Meanwhile, the image frames may be all image frames that exist in the first period, but this is merely an example, and only representative frames among the image frames that exist in the first period may be stored, based on the similarity of the image frames. Also, the electronic device (100) may match the image frames and the audio frames among the video data, and store the frames.

While the electronic device (100) is reproducing the video, the electronic device (100) may receive input of a user's voice (S330). Here, the user's voice may include a trigger voice for initiating an inquiry on information on objects and an inquiry voice inquiring information on the objects.

Then, the electronic device (100) may acquire information on objects included in the video of a predetermined second period in response to the trigger voice (S340). Here, the electronic device (100) may input the video data of the second period based on the time point when the trigger voice was input, among the video data stored in step S320, into a trained AI model, and thereby acquire information on objects included in the video of the second period. Here, the AI model may be implemented as a deep neural network (DNN), but this is merely an example, and the model may be implemented as a different model.

In particular, the AI model may be a model trained to acquire information on objects included in the video of the period by using image frames and audio frames as input data. Meanwhile, the AI model may provide information on an object as a form of one word (e.g., the name of the object, the type of the object, etc.). However, this is merely an example, and the model may provide the information in the form of a sentence or a phrase including a plurality of words (e.g., information on the relation between the object and another object, the movement or location of the object, etc.). In case the AI model is implemented to provide output in the form of a sentence or a phrase including a plurality of words, the AI model may include a first model trained to acquire information on a plurality of objects included in a video by inputting the video data (e.g., a convolutional neural network (CNN) model, etc.) and a second model trained to acquire text information for describing the plurality of objects (e.g., a recurrent neural network (RNN) model, etc.).

In addition, the information on objects may be included as images or audio, as well as text.

The electronic device (100) may acquire a keyword for search based on the information on objects and a user's voice (S350). To be specific, the electronic device (100) may acquire information on an object that is matched with the user's voice among the information on objects acquired in step S340, and generate a keyword for search based on the information on the object that is matched with the user's voice.

Also, the electronic device (100) may acquire a keyword based on information on objects, information on the user and the user's voice (S350). To be specific, the electronic device (100) may select one of the information on objects acquired in step S340, based on the information on the user and the user's voice. Here, the information on the user may include diversified personal information such as information on the user's search history, information on the user's preference, personal information of the user, and the like.

To be specific, in case an ambiguous inquiry voice such as "What is that thing in the center?" is input, the electronic device (100) may acquire objects located in the center, among the objects included in a video. Then, the electronic device (100) may select one of the objects located in the center based on various types of user information such as information on the user's preference, the user's search history, and the like.

According to another embodiment of the disclosure, the electronic device (100) may acquire a keyword by inputting information on objects, information on a user and the user's voice into a trained AI model. That is, the electronic device (100) may acquire a keyword by using an AI model trained to acquire a keyword by using information on objects, information on a user and the user's voice as input data.

According to still another embodiment of the disclosure, the electronic device (100) may acquire a keyword for search by using an AI model trained to acquire a keyword for search by inputting information on objects and a user's voice.

According to still another embodiment of the disclosure, the electronic device (100) may acquire a keyword by inputting information on objects, information on a user and the user's voice into a trained AI model. That is, the electronic device (100) may acquire a keyword by using an AI model trained to acquire a keyword by using information on objects, information on a user and the user's voice as input data.

Meanwhile, the electronic device (100) may transmit a generated keyword to an external search server (200) (S360), and the external search server (200) may perform a search operation based on the keyword (S370).

Then, the external search server (200) may transmit the search result to the electronic device (100) (S380), and the electronic device (100) may provide the search result (S390) to a user. Here, the electronic device (100) may provide the search result while reproducing the video, but this is merely an example, and the search result may be provided after stopping reproduction of the video.

FIG. 4 is a flow chart for illustrating an example in which the electronic device (100) searches for information on objects by being interlocked with an AI server according to another embodiment of the disclosure. Meanwhile, steps S410 to S420 illustrated in FIG. 4 are similar to steps S310 to S330 described in FIG. 3, and thus redundant descriptions therefor will be omitted.

The electronic device (100) may transmit the video data of a predetermined second period acquired in step S420 to an AI server (250) (S425).

The AI server (250) may acquire information on the objects included in the video of the predetermined second period (S430). Here, the AI server (250) may input the video data of the second period into a trained AI model, and thereby acquire information on the objects included in the video of the predetermined second period. Meanwhile, the AI model may be implemented as a DNN, but this is merely an example, and the model may be implemented as a different model.

The AI server (250) may transmit information on objects to the electronic device (100) (S435).

Then, the electronic device (100) may acquire a keyword based on information on objects and a user's voice (S440). To be specific, the electronic device (100) may acquire information on an object that is matched with the user's voice among the information on objects acquired by the AI server (250), and generate a keyword for search based on the information on the object that is matched with the user's voice.

Further, the electronic device (100) may transmit the generated keyword to an external search server (200) (S445), and the external search server (200) may perform a search operation based on the keyword (S450).

Meanwhile, in the embodiment described above, the electronic device (100) generates a keyword and transmits the keyword to the external search server (200). However, this is merely an example, and an AI server (250) may directly input information on objects and a user's voice, and thereby acquire a keyword for search by using an AI model trained to acquire a keyword for search. That is, the AI server (250) may receive the video data of a predetermined second period and also a user's voice in step S425, and acquire a keyword by inputting information on objects acquired based on the video data of the predetermined second period and the user's voice into the AI model.

FIG. 5 is a flow chart for illustrating an example in which the electronic device (100) searches for information on objects by being interlocked with an AI server according to another embodiment of the disclosure. Meanwhile, steps S505 to S515 illustrated in FIG. 5 are similar to steps S310 to S320 described in FIG. 3, and thus redundant descriptions therefor will be omitted.

The electronic device (100) may acquire a frame corresponding to the time point when the input of the user's voice started to be received (S520). To be specific, the electronic device (100) may acquire a frame corresponding to the time point when input of the trigger voice among the user's voices started to be received.

Then, the electronic device (100) may transmit the acquired frame to an external frame recognition server (270) (S525).

The frame recognition server (270) may analyze the acquired frame, and thereby acquire information on the frame (S530). To be specific, the frame recognition server (270) may analyze a fingerprint included in the frame, and thereby acquire information on the frame. Also, the frame recognition server (270) may identify a logo, etc. that exists in a specific area through image analysis, and thereby acquire information on the frame. In addition, the frame recognition server (270) may analyze objects included in the image, and thereby acquire information on the frame. Here, information on the frame may include information on the video content including the frame, information on the objects included in the frame, and the like.

Then, the frame recognition server (270) may transmit the acquired information on the frame to the electronic device (100) (S535).

Meanwhile, the electronic device (100) may transmit information on the frame and the user's voice to a search server (200) (S540).

The search server (200) may perform search based on the information on the frame and the user's voice (S545). To be specific, the search server (200) may acquire a keyword from the information on the frame based on the user's voice, and perform search based on the acquired keyword.

The external search server (200) may transmit the search result to the electronic device (100) (S550), and the electronic device (100) may provide the search result (S555).

Meanwhile, in the embodiment described above, the search server (200) performs search by generating a keyword based on the information on the frame and the user's voice. However, this is merely an example, and the electronic device (100) may generate a keyword based on the information on the frame and the user's voice, and transmit the generated keyword to the external search server (200). Also, the electronic device (100) or the search server (200) may acquire a keyword by inputting the information on the frame and the user's voice into a trained AI model.

FIG. 6 is a diagram for illustrating an example of searching information on objects according to an embodiment of the disclosure.

First, the electronic device (100) may store image frames up to a first period based on the current reproduction time (e.g., from 15 seconds before the current reproduction time until the current reproduction time) while reproducing a video. Here, the electronic device (100) may compare similarities between image frames, and store only representative frames, instead of storing all image frames in the first period. Alternatively, the electronic device (100) may store some image frames among all the image frames of the first period at predetermined intervals. For example, in case the current reproduction time is 1 minute 10 seconds, the electronic device (100) may store the second image frame to the fourth image frame (610-2 to 610-4), which are the image frames of 15 seconds before the current reproduction time, as illustrated in (a) of FIG. 6.

Meanwhile, while the video is being reproduced, the electronic device (100) may receive input of a user's voice "Hi, Bixby! What is that car?" through a microphone (130).

Here, "Hi, Bixby" may be a trigger voice for initiating an inquiry on information on an object, and "What is that car?" may be an inquiry voice inquiring information on the object.

Then, the electronic device (100) may acquire the image frames of a predetermined second period (e.g., from 10 seconds before the time point when the trigger voice was input until the time point when the trigger voice was input) in response to "Hi, Bixby!" which is a trigger voice. For example, in case a trigger voice is input at 1 minute 10 seconds, the electronic device (100) may acquire the third image frame and the fourth image frame (610-3 and 610-4), which are the image frames of 10 seconds before the time point when the trigger voice was input, as illustrated in (a) of FIG. 6.

Further, the electronic device (100) may input the acquired image frames (610-3 and 610-4) into a trained AI model, and thereby acquire information on the objects included in the image frames (610-3 and 610-4). For example, the electronic device (100) may acquire information on a car object (620) and information on a first person (630) included in the third image frame and the fourth image frame (610-3 and 610-4).

Then, the electronic device (100) may acquire a keyword for search based on information on the objects and the user's voice. For example, the electronic device (100) may acquire information on the car object (620) corresponding to the user's voice between the information on the car object (620) and the information on the first person (630) as a keyword, as illustrated in (b) of FIG. 6. Here, the electronic device (100) may acquire a keyword "XX truck" as a keyword, but this is merely an example, and the electronic device (100) may use an image with respect to the car object (620) in the third image frame (610-3) as a keyword.

Further, the electronic device (100) may transmit the acquired keyword to an external search server (200). Then, the external search server (200) may transmit a search result for the "XX truck" to the electronic device (100) in response to the keyword.

The electronic device (100) may provide a search result for the "XX truck" as illustrated in (c) of FIG. 6. Here, the search result for the "XX truck" may include various types of information such as the price information, fuel efficiency information, fuel information, sales information and the like of the XX truck.

Meanwhile, in the embodiment described above, an AI model acquires one word. However, this is merely an example, and an AI model (in particular, a model consisting of a CNN model and an RNN model) may acquire text in the form of a sentence or a phrase including a plurality of words to describe an object. For example, an AI model may acquire text in the form of a sentence or a phrase such as "XX truck behind the first person" and "a blonde girl."

Accordingly, if a user's voice "What is that car behind the first person?", which is an inquiry voice, is input, the electronic device (100) becomes capable of acquiring information on "the car object behind the first person" by using text information describing the object acquired through the AI model.

FIG. 7 is a diagram for illustrating an example of searching for information on objects according to an embodiment of the disclosure.

First, the electronic device (100) may store image frames up to a first period based on the current reproduction time (e.g., from 15 seconds before the current reproduction time until the current reproduction time) while reproducing a video. Here, the electronic device (100) may compare similarities of image frames, and store only representative frames. Alternatively, the electronic device (100) may store some image frames among all the image frames of the first period at predetermined intervals. For example, in case the current reproduction time is 1 minute 10 seconds, the electronic device (100) may store the third image frame to the fifth image frame (710-3 to 710-5), which are the image frames of 15 seconds before the current reproduction time, as illustrated in (a) of FIG. 7.

Meanwhile, the electronic device (100) may receive input of a user's voice "Hi, Bixby! Who is the person in the center?" through the microphone (130), while the video is being reproduced. Here, "Hi, Bixby" may be a trigger voice for initiating an inquiry on information on an object, and "Who is the person in the center?" may be an inquiry voice inquiring information on the object.

Then, the electronic device (100) may acquire the image frames of a predetermined second period (e.g., from 10 seconds before the time point when the trigger voice was input until the time point when the trigger voice was input) in response to "Hi, Bixby!" which is a trigger voice. For example, in case a trigger voice is input at 1 minute 10 seconds, the electronic device (100) may acquire the third image frame to the fifth image frame (710-3 and 710-5), which are the image frames of 10 seconds before the time point when the trigger voice was input, as illustrated in (a) of FIG. 7.

Further, the electronic device (100) may input the acquired image frames (710-3 to 710-5) into a trained AI model, and thereby acquire information on the objects included in the image frames (710-3 to 710-5). For example, the electronic device (100) may acquire information on the first person to the third person (720-1 to 720-3) included in the third image frame (710-3) and information on the fourth person to the eighth person (730-1 to 730-5) included in the fourth image frame (710-4).

In particular, the electronic device (100) may acquire the names of the objects and also information like the locations of the objects, the sizes of the objects, etc. describing the objects, as information on the objects included in the third and fourth image frames (710-3 and 710-4).

Then, the electronic device (100) may acquire a keyword based on the information on the objects and the user's voice as well as the information on the user and the importance of the objects on the screen. For example, the electronic device (100) may acquire information on the seventh person (730-4) corresponding to the user's voice among the first person to the third person (720-1 to 720-3) included in the third image frame (710-3) and the fourth person to the eighth person (730-1 to 730-5) included in the fourth image frame (710-4) as a keyword for search, as illustrated in (b) of FIG. 7. To be specific, the electronic device (100) may acquire information on the second person (720-2), the fifth person (730-2), the sixth person (730-3), and the seventh person (730-4), who are the people located in the center, among the information on the objects included in the third and fourth image frames (710-3 and 710-4). Also, the electronic device (100) may select one of the second person (720-2), the fifth person (730-2) the sixth person (730-3), and the seventh person (730-4) based on at least one of the information on the user or the importance of the people on the screen. For example, the electronic device (100) may select the sixth person (730-3) by determining whether the second person (720-2), the fifth person (730-2), the sixth person (730-3), and the seventh person (730-4) are people having a preferred style by the user, or whether they are the main characters in the video. Then, the electronic device (100) may acquire a keyword based on the information on the selected sixth person (730-3).

According to another embodiment of the disclosure, the electronic device (100) may input information on objects (which may include information on the importance of the objects on the screen), information on the user, and the user's voice into a trained AI model, and thereby acquire a keyword corresponding to the user's voice.

Here, the keyword may be in the form of text, but this is merely an example, and the keyword may be the image of the sixth person (730-3) included in the fourth frame (710-4).

Then, the electronic device (100) may transmit the acquired keyword to an external search server (200). The external search server (200) may transmit a search result for "the sixth person (730-3)" to the electronic device (100) in response to the keyword.

Further, the electronic device (100) may provide a search result for "the sixth person (730-3)", as illustrated in (c) of FIG. 7. Here, the search result for "the sixth person (730-3)" may include various types of information such as the name, age, representative job, work, and the like of the sixth person.

Meanwhile, FIGS. 6 and 7 describe that information on objects included in a video is acquired from image frames. However, this is merely an example, and information on objects included in a video may be acquired from audio frames. For example, in case a voice "Hi, Bixby. What is that song?" is input from a user while the main character of a video is singing a song called "A," the electronic device (100) may input audio frames in the video data into a trained AI model, and thereby acquire information on a plurality of voices included in the video. Then, the electronic device (100) may acquire a keyword based on the information on the song "A" corresponding to the user's voice, among the information on the plurality of voices included in the video.

Figure 8A:
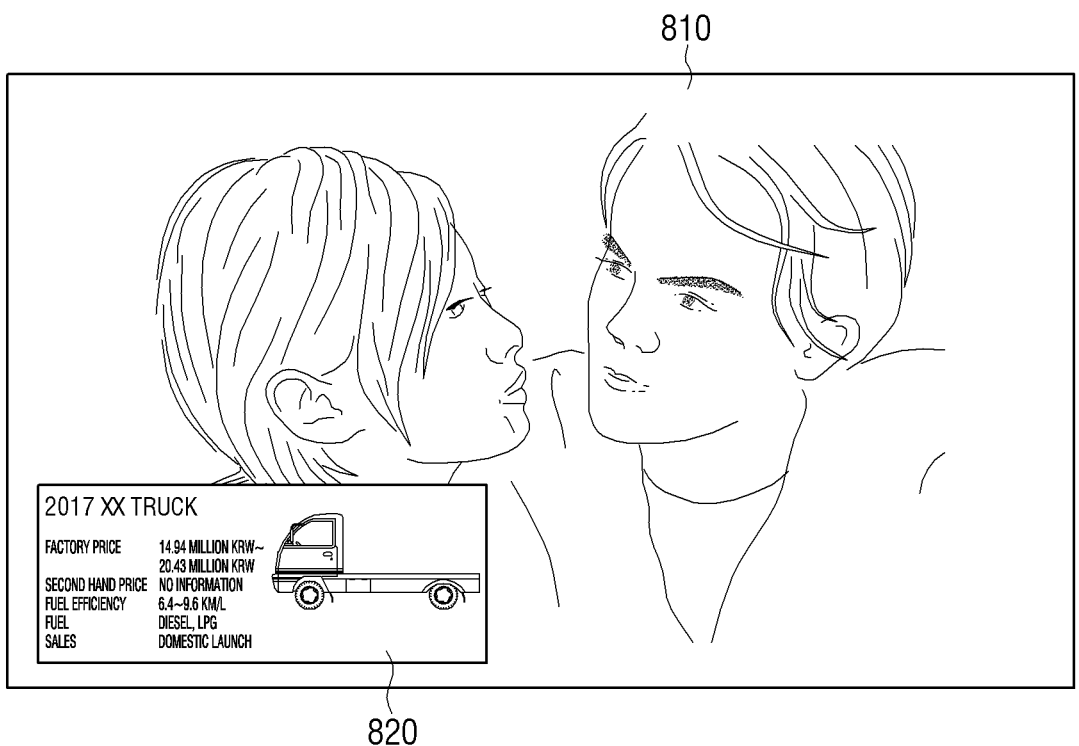
FIG. 8A is a diagram for illustrating an example of providing information about objects included in a video while the video is being reproduced, according to an embodiment of the disclosure.
Figure 8B:
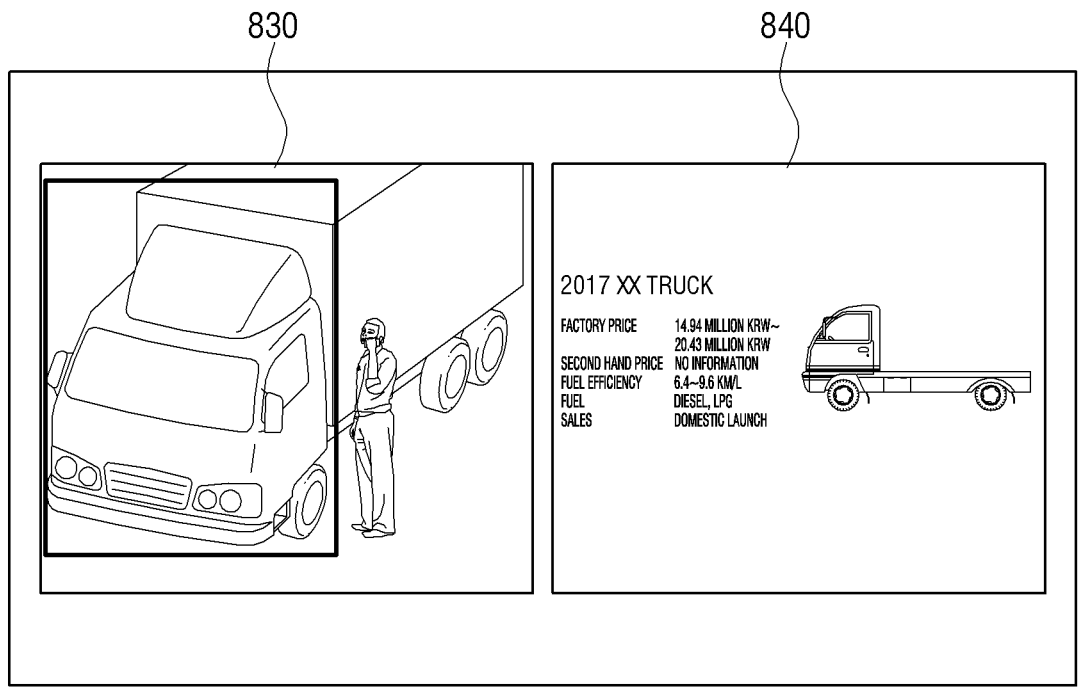
FIG. 8B is a diagram for illustrating an example of providing information about objects included in a video while the video is being reproduced, according to an embodiment of the disclosure.

FIGS. 8A and 8B are diagrams for illustrating a method in which an electronic device provides a search result according to an embodiment of the disclosure.

First, the electronic device (100) may provide a search result received from an external search server (200) together with the video that is currently being reproduced. For example, the electronic device (100) may provide a screen (820) including the search result on the video (810) that is currently being reproduced, as illustrated in FIG. 8A.

According to an embodiment of the disclosure, the screen including the search result may be displayed in a predetermined area (e.g., a lower left area of the screen). According to another embodiment of the disclosure, the screen (820) including the search result may be provided in an area in which objects are not disposed in the video (810) that is currently being reproduced, as illustrated in FIG. 8A.

Also, the size and location of the screen (820) including the search result may be adjusted according to a user input.

Meanwhile, in case an object corresponding to the search result is included in the video (810) that is currently being reproduced, the electronic device (100) may provide an indicator (e.g., indication in the form of a box) to the object corresponding to the search result.

Also, the electronic device (100) may stop or pause the video that is currently being reproduced, and provide a search result received from the external search server (200). Here, the electronic device (100) may provide a screen (840) including the search result together with the previous frame (830) including the object corresponding to the search result, as illustrated in FIG. 8B.

Further, if a predetermined user input (e.g., a user input selecting the previous frame (830) including the object corresponding to the search result) is received, the electronic device (100) may reproduce the video again from the previous frame (830) including the object corresponding to the search result.

Figure 9A:
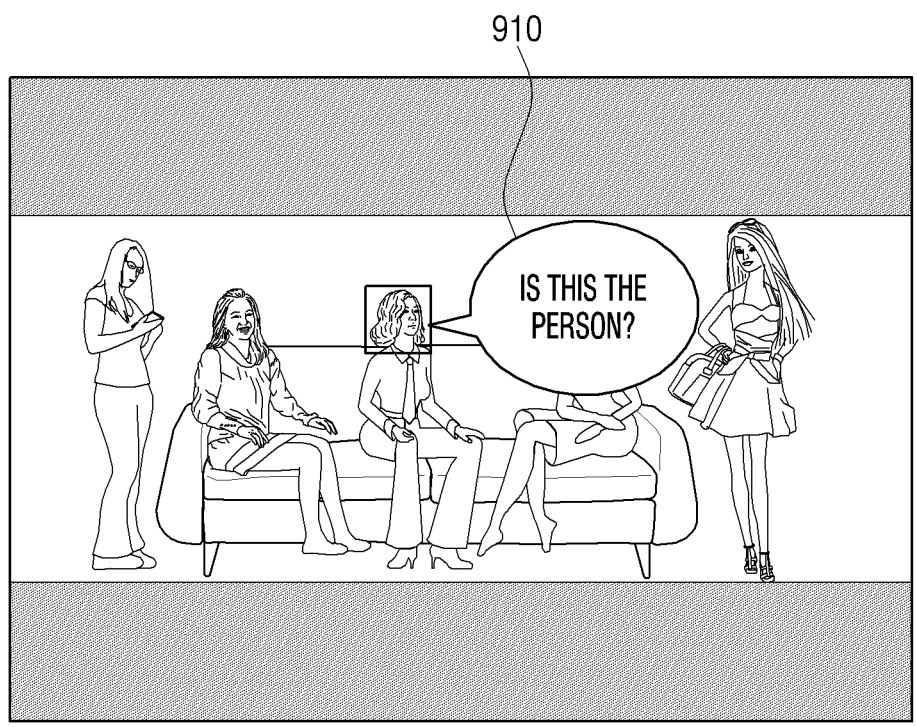
FIG. 9A is a diagram for illustrating a UI for identification or an additional inquiry with respect to an object according to an embodiment of the disclosure.
Figure 9B:
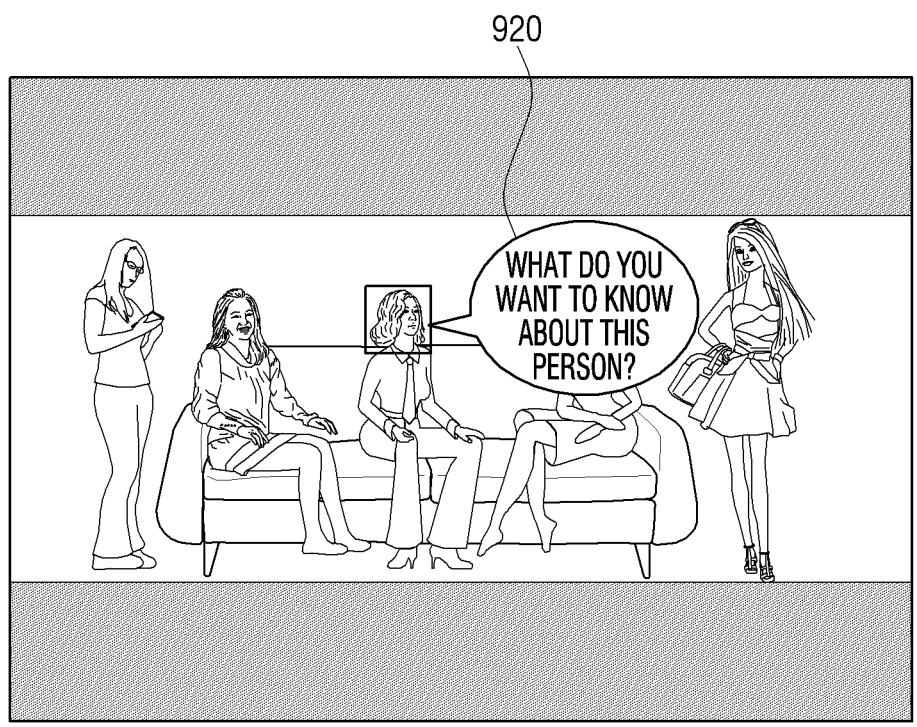
FIG. 9B is a diagram for illustrating a UI for identification or an additional inquiry with respect to an object according to an embodiment of the disclosure.

FIGS. 9A and 9B are diagrams for illustrating a UI for identification or an additional inquiry with respect to an object according to an embodiment of the disclosure.

First, the electronic device (100) may provide a UI for identifying whether an object is an object corresponding to a user's voice. To be specific, after an object corresponding to a user's voice is selected, the electronic device (100) may provide a UI (910) for identifying whether the object is an object corresponding to the user's voice, as illustrated in FIG. 9A. That is, as described in conjunction with FIG. 7, after the seventh person is selected, the electronic device (100) may provide a UI (910) for inquiring whether the person located in the center is the seventh person. Here, the UI (910) may be in the form of a speech bubble, as illustrated in FIG. 9A, but this is merely an example, and the UI may be implemented in a different type of UI (e.g., a UI in the form of a box displayed in a predetermined area). Meanwhile, the UI (910) in the form of a speech bubble may be opaque, but this is merely an example, and the UI may be translucent.

If a user input (e.g., a user's voice) identifying that the person is the seventh person is received, the electronic device (100) may acquire a keyword for search based on the information on the seventh person. Alternatively, the electronic device (100) may provide a UI (920) for inquiring additional information on the seventh person, as illustrated in FIG. 9B. Here, the electronic device (100) may provide a UI inquiring additional information in specific types with respect to the seventh person (e.g., the name, age, nationality, etc.).

Alternatively, if a user input identifying that the person is not the seventh person is received, the electronic device (100) may provide a UI for identifying whether the person is the person in a latter position between the second person (720-2) and the fifth person (730-2), instead of the seventh person.

FIG. 10 is a flow chart for illustrating a method for controlling an electronic device according to an embodiment of the disclosure.

The electronic device (100) reproduces a video (S1010).

The electronic device (100) may store the video data of a predetermined period based on the reproduction time while reproducing the video (S1020). Here, the video data may be one of image frames and/or audio frames.

Then, the electronic device (100) may receive input of a user's voice for inquiring information on objects in the video (S1030). Here, the user's voice may include a trigger voice for initiating an inquiry on information and an inquiry voice inquiring information on the objects.

The electronic device (100) may input the video data corresponding to the time point when the user's voice was input into a trained AI model through an AI algorithm, and thereby acquire information on a plurality of objects included in the video data (S1040). In particular, the electronic device (100) may input the video data of a predetermined period from the time point when the input of the trigger voice started into the AI model, and thereby acquire information on the plurality of objects.

Then, the electronic device (100) may provide a search result performed by an external search server (200) based on the information on the plurality of objects and the user's voice (S1050). Further, the electronic device (100) may generate a keyword for search based on the information on an object corresponding to the user's voice among the information on the plurality of objects. Here, the electronic device (100) may input the information on the plurality of objects and the user's voice into a trained AI model, and generate a keyword corresponding to the user's voice. Then, the electronic device (100) may transmit the keyword to the external search server (200), and receive a search result from the external search server (200). Further, the electronic device (100) may provide the received search result. Here, the electronic device (100) may provide the received search result while the video is being reproduced. However, this is merely an example, and the electronic device may provide the search result after stopping the reproduction of the video.

Figure 11:
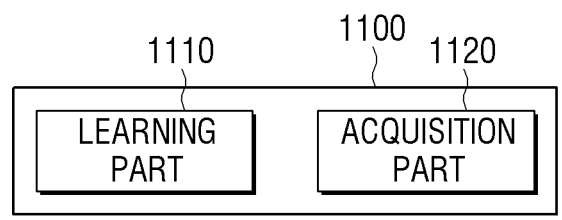
FIG. 11 is a block diagram for illustrating the constitution of an electronic device for learning an AI model and using the model according to an embodiment of the disclosure.

FIG. 11 is a block diagram for illustrating the constitution of an electronic device for training an AI model and using the model according to an embodiment of the disclosure.

Referring to FIG. 11, the processor (1100) may include at least one of a learning part (1110) or an acquisition part (1120). The processor (1100) in FIG. 11 may correspond to the processor (150) or the data learning server of the electronic device (100) in FIGS. 2A and 2B.

The learning part (1110) may generate or train a first model for recognizing a plurality of objects included in a video, or a second model for acquiring a keyword for a user's voice by using learning data. Further, the learning part (1110) may generate a trained model having a recognition standard by using the collected learning data.

As an example, the learning part (1110) may generate, train or update a first model for acquiring information on a plurality of objects included in a video, by using the video data as input data. Also, the learning part (1110) may generate, train or update a second model for acquiring a keyword corresponding to a user's voice, by using information on a plurality of objects, information on the user, and the user's voice as input data. Meanwhile, according to another embodiment of the disclosure, the first model and the second model may be implemented as a model in which the two models are integrated. That is, an integrated model may acquire a keyword corresponding to a user's voice by using the video data and the user's voice as input data.

The acquisition part (1120) may acquire various types of information by using specific data as input data of a trained model.

For example, the acquisition part (1120) may acquire (or, recognize, estimate) information on a plurality of objects included in a video by using the video data as input data of a trained first model. Also, the acquisition part (1120) may acquire (or, estimate, infer, recognize) a keyword corresponding to a user's voice among a plurality of objects by using information on the plurality of objects, information on the user, and the user's voice as input data of a trained second model.

At least a portion of the learning part (1110) and at least a portion of the acquisition part (1120) may be implemented as a software module or may be implemented in the form of at least one hardware chip, and mounted on the electronic device. For example, at least one of the learning part (1110) or the acquisition part (1120) may be manufactured in the form of a dedicated hardware chip for AI, or may be manufactured as a portion of a conventional generic-purpose processor (e.g., a CPU or an application processor) or a graphic dedicated processor (e.g., a GPU), and mounted on various types of electronic devices described herein. Here, a dedicated hardware chip for AI is a dedicated processor which is specialized in probability operation, and shows a more excellent performance in parallel processing than conventional generic-purpose processors, and thus can process operations in fields of AI such as machine learning fast. Meanwhile, in case the learning part (1110) and the acquisition part (1120) are implemented as software modules (or, program modules including instructions), the software modules may be stored in a non-transitory computer readable medium. In this case, the software modules may be executed by an operating system (OS), or by a specific application. Alternatively, some portions of the software modules may be provided by an OS, and the remaining portions may be provided by a specific application.

In a case as above, the learning part (1110) and the acquisition part (1120) may be mounted on one electronic device, or may be mounted on or installed in separate electronic devices. For example, one of the learning part (1110) or the acquisition part (1120) may be included in the electronic device (100), and the other one may be included in an external server. Also, the learning part (1110) and the acquisition part (1120) are wired or wirelessly connected to each other, and thus the model information constructed by the learning part (1110) may be provided to the acquisition part (1120), and the data input into the learning part (1110) may be provided to the learning part (1110) as additional learning data.

Figure 12A:
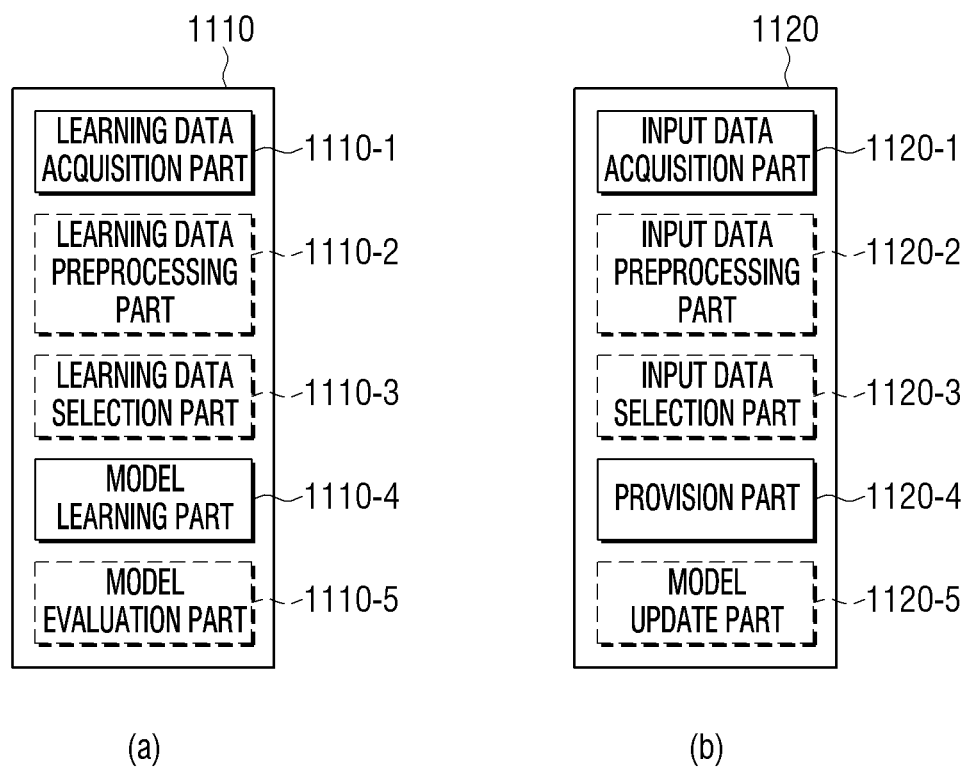
FIG. 12A is a block diagram for illustrating the detailed constitution of a learning part and a recognition part according to an embodiment of the disclosure.

FIG. 12A is a block diagram for illustrating the learning part (1110) and the acquisition part (1120) according to an embodiment of the disclosure.

Referring to (a) of FIG. 12A, the learning part (1110) may include a learning data acquisition part (1110-1) and a model learning part (1110-4). Also, the learning part (1110) may further include at least one of a learning data preprocessing part (1110-2), a learning data selection part (1110-3) or a model evaluation part (1110-5).

The learning data acquisition part (1110-1) may acquire learning data that is necessary for a first model and a second model. According to an embodiment of the disclosure, the learning data acquisition part (1110-1) may acquire video data, information on a plurality of objects, information on a user, a user's voice, etc. as learning data. Meanwhile, learning data may be data collected or tested by the learning part (1110) or the manufacturer of the learning part (1110).

The model learning part (1110-4) may train an AI model to have a standard for how to recognize an object included in a video, and how to acquire a keyword for an object corresponding to a user's voice among a plurality of objects, by using learning data. For example, the model learning part (1110-4) may train an AI model through supervised learning using at least a portion of learning data as a standard for determination. Or, the model learning part (1110-4) may, for example, train an AI model through unsupervised learning by which an AI model independently learns by using learning data without supervision, and develops a determination for standard determination of circumstances. Also, the model learning part (1110-4) may, for example, train an AI model through reinforcement learning using a feedback on whether a result of determination on a circumstance according to learning is correct. In addition, the model learning part (1110-4) may, for example, train an AI model by using a learning algorithm including error back-propagation or gradient descent, and the like.

In case there are a plurality of AI models constructed in advance, the model learning part (1110-4) may determine or select an AI model using correlation between input learning data and the basic learning data is high as an AI model to be trained. In this case, the basic learning data may have been classified in advance according to the types of data, and AI models may have been constructed in advance according to the types of data. For example, the basic learning data may have been classified in advance based on various standards such as the region where the learning data was generated, the time when the learning data was generated, the size of the learning data, the genre of the learning data, the generator of the learning data, the types of objects in the learning data, etc.

When an AI model is trained, the model learning part (1110-4) may store the trained AI model. In this case, the model learning part (1110-4) may store the trained AI model in the memory (130) of the electronic device (100). Alternatively, the model learning part (1110-4) may store the trained AI model in a server (e.g., an AI server (250)) that is communicatively connected to the electronic device (100) through wire or a wireless network.

Meanwhile, the learning part (1110) may further include a learning data preprocessing part (1110-2) and a learning data selection part (1110-3), to improve the recognition result of an AI model, or save resources or time necessary for generating an AI model.

The learning data preprocessing part (1110-2) may preprocess the acquired data, so that the acquired data can be used in learning for acquiring information on objects and generating a keyword. In addition, the learning data preprocessing part (1110-2) may process the acquired data in a predetermined format, so that the model learning part (1110-4) can use the acquired data for learning or acquiring information on objects and generating a keyword.

The learning data selection part (1110-3) may select data necessary for learning between the data acquired at the learning data acquisition part (1110-1) and the data preprocessed at the learning data preprocessing part (1110-2). The selected learning data may be provided to the model learning part (1110-4). Further, the learning data selection part (1110-3) may select learning data necessary for learning between the acquired data or the preprocessed data, according to a predetermined standard for selection. Also, the learning data selection part (1110-3) may select learning data according to a predetermined standard for selection, by learning by the model learning part (1110-4).

Meanwhile, the learning part (1110) may further include a model evaluation part (1110-5), for improving the recognition result of an AI model.

The model evaluation part (1110-5) may input evaluation data into an AI model, and in case the recognition result output from the evaluation data does not satisfy a predetermined standard, may make the model learning part (1110-4) learn again. In this case, the evaluation data may be predefined data for evaluating an AI model.

For example, in case the number or ratio of evaluation data of which recognition results are not correct, among the recognition results of a trained AI model for evaluation data, exceeds a predetermined threshold value, the model evaluation part (1110-5) may evaluate that the AI model does not satisfy a predetermined standard.

Meanwhile, in case there are a plurality of trained AI models, the model evaluation part (1110-5) may evaluate whether each of the trained AI models satisfies a predetermined standard, and determine a model satisfying a predetermined standard as a final AI model. In this case, if there are a plurality of models satisfying a predetermined standard, the model evaluation part (1110-5) may select one model or models in a predetermined number that were set in advance in the order of having higher evaluation scores as final AI models.

Referring to (b) of FIG. 12A, the acquisition part (1120) may include an input data acquisition part (1120-1) and a provision part (1120-4).

Also, the acquisition part (1120) may further include at least one of an input data preprocessing part (1120-2), an input data selection part (1120-3) or a model update part (1120-5).

The input data acquisition part (1120-1) may acquire data necessary for acquiring information on objects included in a video, and acquiring a keyword for an object corresponding to a user's voice. Meanwhile, the provision part (1120-4) may acquire information on objects included in a video and a keyword for an object corresponding to a user's voice by applying input data acquired at the input data acquisition part (1120-1) to a trained AI model as an input value. Also, the provision part (1120-4) may acquire a recognition result by applying data selected by an input data preprocessing part (1120-2) or an input data selection part (1120-3) that will be described below to an AI model as an input value. The recognition result may be determined by the AI model.

According to an embodiment of the disclosure, the provision part (1120-4) may acquire (or, estimate) information on a plurality of objects included in a video by applying the video data acquired at the input data acquisition part (1120-1) to a trained first model.

According to another embodiment of the disclosure, the provision part (1120-4) may acquire (or, estimate) a keyword corresponding to a user's voice by applying information on an object acquired at the input data acquisition part (1120-1), information on the user and the user's voice to a second model.

Meanwhile, the acquisition part (1120) may further include an input data preprocessing part (1120-2) and an input data selection part (1120-3), for improving the recognition result of an AI model, or saving resources or time for providing a recognition result.

The input data preprocessing part (1120-2) may preprocess acquired data, so that the acquired data can be used for being input into first and second models. Also, the input data preprocessing part (1120-2) may process the acquired data in a predefined format, so that the provision part (1120-4) can use the acquired data for acquiring information on objects and generating a keyword.

Meanwhile, the input data selection part (1120-3) may select data necessary for determination of a circumstance, between the data acquired at the input data acquisition part (1120-1) and the data preprocessed at the input data preprocessing part (1120-2). The selected data may be provided to the provision part (1120-4). Also, the input data selection part (1120-3) may select some or all of the acquired or preprocessed data, according to a predetermined standard for selection for determination of a circumstance. In addition, the input data selection part (1120-3) may select data according to a predetermined standard for selection by learning by a model learning part (1110-4).

The model update part (1120-5) may control an AI model to be updated, based on evaluation of the recognition result provided by the provision part (1120-4). For example, the model update part (1120-5) may provide a recognition result provided by the provision part (1120-4) to the model learning part (1110-4), and thereby request the model learning part (1110-4) to additionally learn or update the AI model.

Figure 12B:
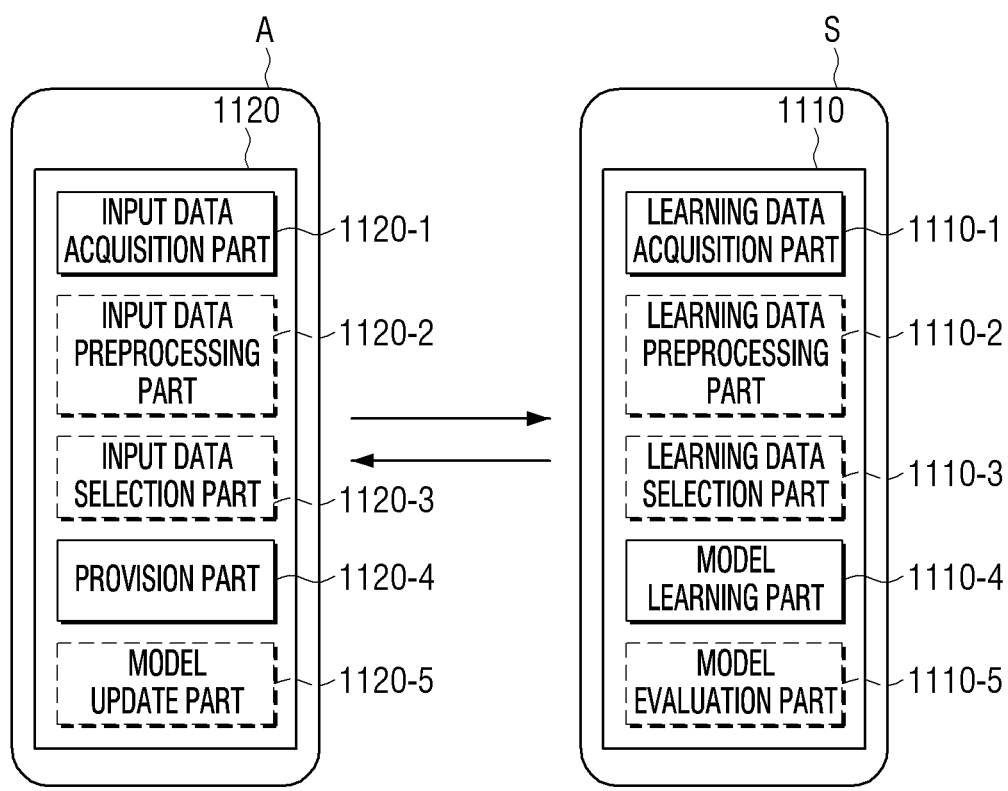
FIG. 12B is a block diagram for illustrating the detailed constitution of a learning part and a recognition part according to an embodiment of the disclosure.

FIG. 12B is a diagram for illustrating an example in which an electronic device (A) and an external server (S) according to an embodiment of the disclosure learn and determine data by being interlocked with each other.

Referring to FIG. 12B, an external server (S) may learn a standard for acquiring information on a plurality of objects included in a video, and acquiring a keyword for an object corresponding to a user's voice. An electronic device (A) may acquire information on a plurality of objects included in a video by using models generated based on the learning result by the server (S), and acquire a keyword for an object corresponding to a user's voice.

In this case, the model learning part (1110-4) of the server (S) may perform the function of the learning part (1110) illustrated in FIG. 11. The model learning part (1110-4) of the server (S) may learn a standard for determination (or, a standard for recognition) for the first and second models.

Further, the provision part (1120-4) of the electronic device (A) may acquire information on a plurality of objects included in a video, and acquire a keyword for an object corresponding to a user's voice, by applying data selected by the input data selection part (1120-3) to an AI model generated by the server (S). Alternatively, the provision part (1120-4) of the electronic device (A) may acquire information on a plurality of objects included in a video, and acquire a keyword for an object corresponding to a user's voice by receiving an AI model generated by the server (S) from the server (S), and using the received AI model.

Figure 13:
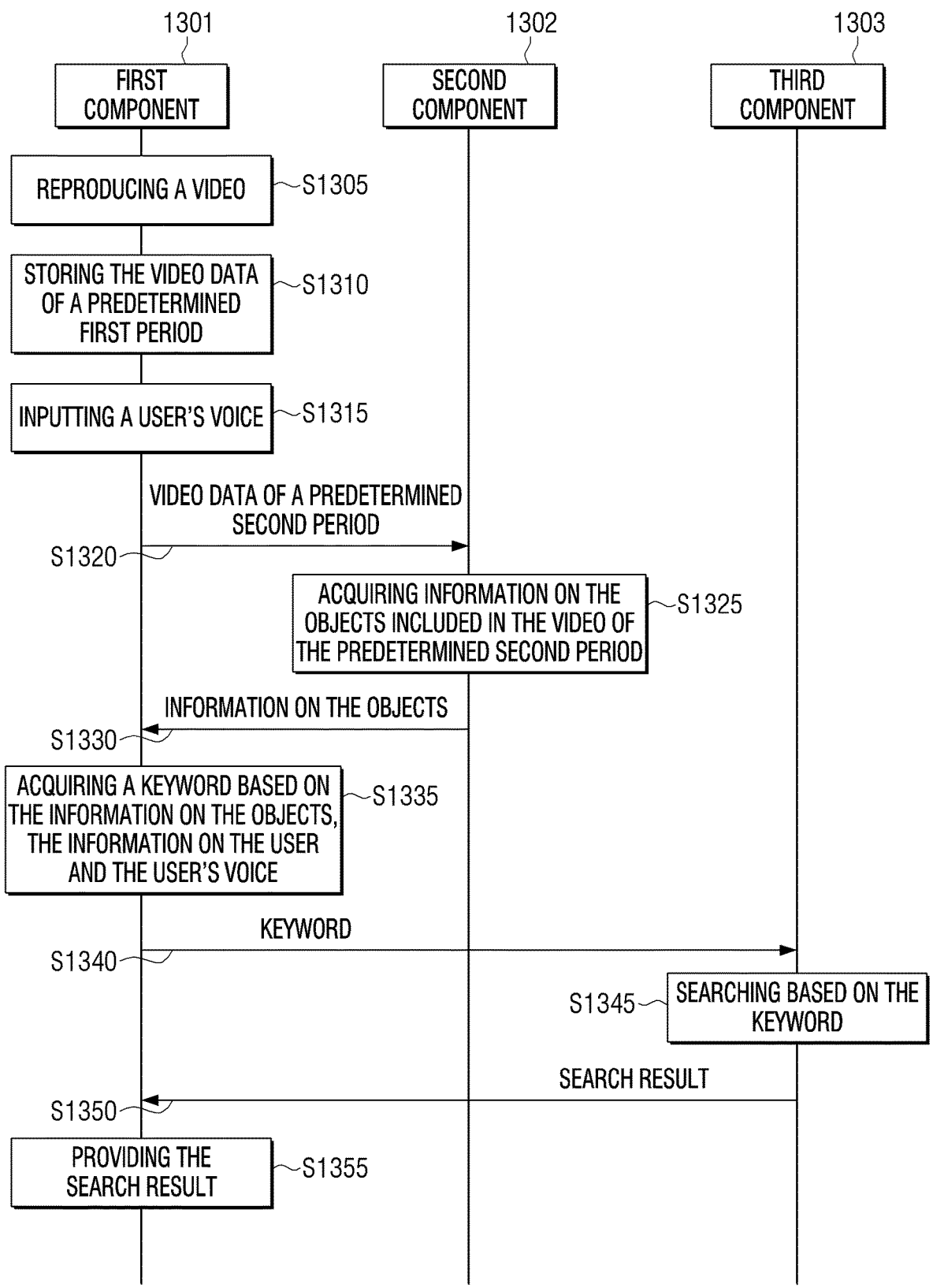
FIG. 13 is a flow chart for illustrating a network system using an AI model according to an embodiment of the disclosure.
Figure 14:
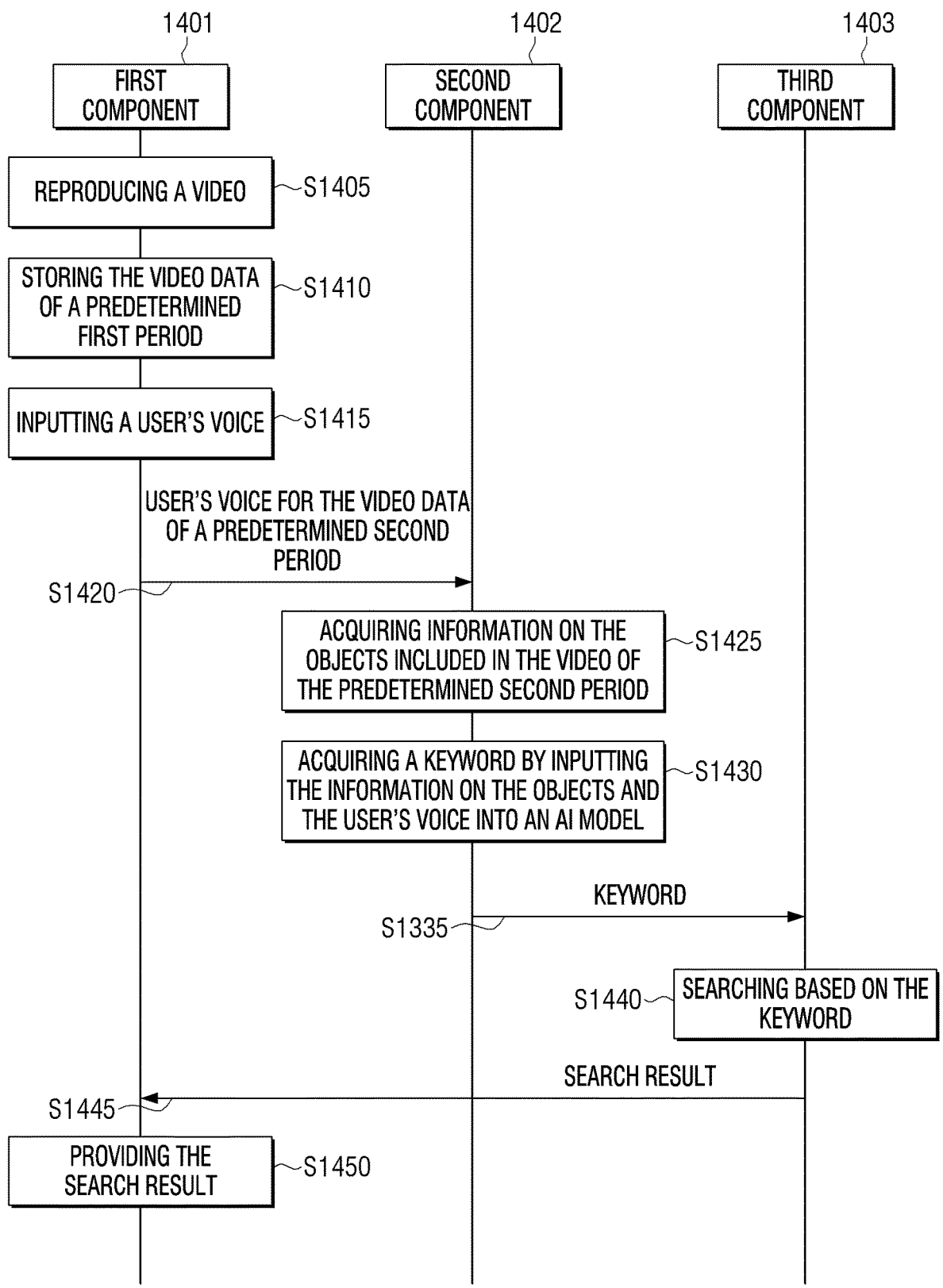
FIG. 14 is a flow chart for illustrating a network system using an AI model according to an embodiment of the disclosure.

FIGS. 13 and 14 are flow charts of a network system using a trained model according to an embodiment of the disclosure. In FIGS. 13 and 14, a network system using a trained AI model may include a first component (1301, 1401), a second component (1302, 1402) and a third component (1303, 1403).

Here, the first component (1301, 1401) may be an electronic device (A), and the second component (1302, 1402) may be a server (S) storing an AI model. Alternatively, the first component (1301, 1401) may be a generic-purpose processor, and the second component (1302, 1402) may be an AI dedicated processor. Or, the first component (1301, 1401) may be at least one application, and the second component (1302, 1402) may be an operating system (OS). That is, the second component (1302, 1402) may be a component that is more integrated, dedicated, has less delay, has superior performance or more resources than the first component (1301, 1401), and that is capable of processing a number of operations required in generating, updating or applying a data recognition model more swiftly and effectively than the first component (1301, 1401).

In this case, an interface for transmitting/receiving data between the first component (1301, 1401) and the second component (1302, 1402) may be defined.

As an example, an application program interface (API) having learning data to be applied to a recognition model as a factor value (or, a medium value or a transmission value) may be defined. An API may be defined as a set of sub routines or functions that can be called for specific processing from a protocol (e.g., a protocol defined at the electronic device (A)) to another protocol (e.g., a protocol defined at the server (S)). That is, through an API, an environment may be provided in which operations from a protocol to another protocol can be performed.

Meanwhile, the third component (1303, 1403) may acquire a search result associated with an object based on a keyword in at least one of the first component (1301, 1401) and the second component (1302, 1402). The third component (1303, 1403) may correspond, for example, to an external search server (200). Here, the data received by the third component (1303, 1403) may be, for example, text information, image, and the like. Also, according to an embodiment of the disclosure, the third component (1303, 1403) may be implemented as a device together with the second component (1302, 1402).

In FIG. 13, the first component (1301) may reproduce a video (S1305). Here, the reproduced video may be a video by a streaming method, but this is merely an example, and the video may be a video that has been downloaded and completely stored before the video was reproduced.

The first component (1301) may store the video data of a predetermined first period while the video is being reproduced (S1310). Here, the video data of a predetermined first period may include the image frames and the audio frames in the first period based on the current reproduction time, but this is merely an example, and the video data may include the metadata, etc. of the video.

While the first component (1301) reproduces the video, the first component (1301) may receive input of a user's voice (S1315). Here, the user's voice may include a trigger voice for initiating an inquiry on information on objects and an inquiry voice inquiring information on the objects.

Then, the first component (1301) may transmit the acquired video data of a predetermined second period to the second component (1302) (S1320). Here, the video data of a predetermined second period may be the video data of a predetermined period based on the time point when the trigger voice was input.

The second component (1302) may acquire information on the objects included in the video of the predetermined second period (S1325). Here, the second component (1302) may input the video data of the second period into a trained AI model, and thereby acquire information on the objects included in the video of the second period. Meanwhile, the AI model may be implemented as a deep neural network (DNN), but this is merely an example, and the model may be implemented as a different model.

Then, the second component (1302) may transmit information on the objects to the first component (1301) (S1330).

The first component (1301) may acquire a keyword for search based on the information on the object, the information on the user, and the user's voice (S1335). To be specific, the first component (1301) may acquire information on an object that is matched with the information on the user and the user's voice among the information on objects acquired by the second component (1302), and acquire a keyword for search based on the information on the object that is matched with the information on the user and the user's voice.

Then, the first component (1301) may transmit the generated keyword to the third component (1303) (S1340), and the third component (1303) may perform a search operation based on the keyword (S1345).

The third component (1303) may transmit the result of the search based on the keyword to the first component (1301) (S1350), and the first component (1301) may provide the search result (S1355).

In FIG. 14, the first component (1401) may reproduce a video (S1405).

The first component (1401) may store the video data of a predetermined first period while the video is being reproduced (S1410). Here, the video data of a predetermined first period may include the image frames and the audio frames in the first period based on the current reproduction time, but this is merely an example, and the video data may include the metadata, etc. of the video.

While the first component (1401) is reproducing the video, the first component (1401) may receive input of a user's voice (S1415). Here, the user's voice may include a trigger voice for initiating an inquiry on information on objects and an inquiry voice inquiring information on the objects.

Then, the first component (1401) may transmit the acquired video data of the predetermined second period and the user's voice to the second component (1402) (S1420). Here, the video data of the predetermined second period may be the video data of a predetermined period based on the time point when the trigger voice was input.

The second component (1402) may acquire information on the objects included in the video of the predetermined second period (S1425). Here, the second component (1402) may input the video data of the second period into a trained AI model, and thereby acquire information on the objects included in the video of the second period. Meanwhile, the AI model may be implemented as a DNN, but this is merely an example, and the model may be implemented as a different model.

Then, the second component (1402) may acquire a keyword for search by inputting the information on the objects and the user's voice into the AI model (S1430). That is, the second component (1402) may acquire a keyword corresponding to the user's voice by inputting the information on the objects and the user's voice into an AI model trained to acquire a keyword. Here, to the AI model, information on the user as well as the information on the objects and the user's voice may be input.

The second component (1402) may transmit the generated keyword to the third component (1403) (S1435), and the third component (1403) may perform a search operation based on the keyword (S1440).

Then, the third component (1403) may transmit the search result to the first component (1401) (S1445), and the first component (1401) may provide the search result (S1450).

Figure 15:
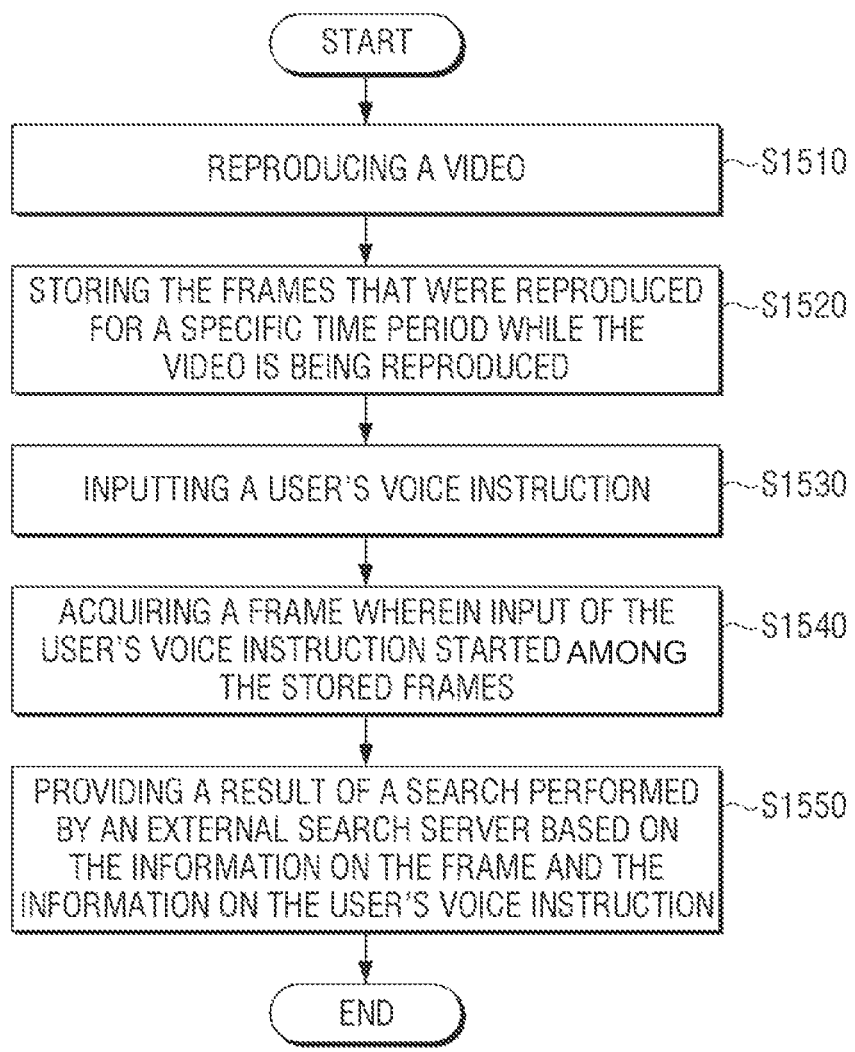
FIG. 15 is a flow chart for illustrating a method for controlling an electronic device according to an embodiment of the disclosure.

FIG. 15 is a flow chart for illustrating a method for controlling an electronic device according to an embodiment of the disclosure.

The electronic device (100) may reproduce a video (S1510).

The electronic device (100) may store frames that were reproduced for a specific time period while the video is being reproduced (S1520). For example, the electronic device (100) may store the video of a predetermined period based on the current reproduction time.

Meanwhile, the electronic device (100) may receive input of a user's voice instruction while the video is being reproduced (S1530). Here, the user's voice instruction may include a trigger voice for initiating an inquiry on information on the objects included in a frame and an inquiry voice inquiring information on the objects.

Then, the electronic device (100) may acquire a frame wherein input of the user's voice instruction started, among the stored frames (S1540). For example, the electronic device (100) may acquire a frame corresponding to the time point when the user's voice instruction (in particular, the trigger voice) was input, among the pre-stored frames of the first period. Alternatively, the electronic device (100) may acquire frames of the second period based on the frame corresponding to the time point when the user's voice instruction (in particular, the trigger voice) was input, among the pre-stored frames of the first period. For example, the electronic device (100) may store frames during 5 seconds before and after the current reproduction time, and when a user's voice instruction is input, the electronic device (100) may acquire frames during 2 seconds before and after the time point when the user's voice instruction was input, among the frames during 5 seconds before and after the current reproduction time.

Further, the electronic device (100) may provide a search result performed by an external search server, based on the information on the frames and the information on the user's voice instruction (S1550). According to an embodiment of the disclosure, the electronic device (100) may input the acquired frames (or the frames of the second period) into an AI model, and thereby acquire information on a plurality of objects included in the frames. Then, the electronic device (100) may acquire a keyword based on the information on the plurality of objects and the user's voice, transmit the acquired keyword to the external search server, receive a search result performed by the external search server, and provide the search result.

According to another embodiment of the disclosure, the electronic device (100) may transmit the acquired frames to an external server, and receive information on the frames (e.g., information on the video content, information on the objects included in the frames, etc.) acquired by the external server by analyzing the acquired frames. Then, the electronic device (100) may transmit the acquired information on the frames and the user's voice to an external search server, and receive a search result from the external search server.

The various embodiments of the disclosure may be implemented as software including computer-readable instructions stored in machine-readable storage media, which can be read by machines (e.g.: computers). The machines refer to apparatuses that read instructions stored in and loaded from a storage medium, and can operate according to the called instructions, and the apparatuses may include an electronic device according to the aforementioned embodiments (e.g. an electronic device (100)). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g. compact disc read only memory (CD-ROM)), or through an application store (e.g. Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g. a module or a program) may consist of a singular object or a plurality of objects. Also, among the aforementioned corresponding sub components, some sub components may be omitted, or other sub components may be further included in the various embodiments. Generally or additionally, some components (e.g. a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed or omitted in a different order, or other operations may be added.

What is claimed is:

1. A method for controlling an electronic device comprising:
displaying a video;
storing a plurality of frames of the reproduced video for a first time period while displaying the video;
receiving a user voice input of a user while displaying a first frame of the video, the user voice input comprising a request for information about an object displayed in the video;
based on the user voice input comprising the request for information about the object being received:
selecting a plurality of second frames based on a time point at which the user voice input is received, wherein the plurality of second frames are included in the stored plurality of frames, and the plurality of second frames were displayed by the electronic device during a second time period that is a predetermined amount of time prior to the time point when the user voice input is started to be received;
obtaining the information about the object based on a result of inputting the plurality of second frames into an artificial intelligence model trained through an artificial intelligence algorithm, wherein the information about the object comprises identification information of the object, position information of the object and size information of the object;
acquiring a keyword corresponding to the object based on the identification information of the object, the position information of the object, the size information of the object and the user voice input; and
providing a search result based on the keyword.

2. The method for controlling an electronic device of claim 1, wherein the user voice input comprises a trigger voice for initiating an inquiry for the information about the object and an inquiry voice for the information about the object, and
wherein the inputting the plurality of second frames into the artificial intelligence model comprises inputting the plurality of second frames based on the time point when the user voice input is received into the artificial intelligence model.

3. The method for controlling an electronic device of claim 1, wherein the plurality of second frames comprises an image frame and an audio frame,
wherein the inputting the plurality of second frames, based on the user voice input being received, into the artificial intelligence model comprises matching the image frame and the audio frame, and
wherein the obtaining of the information about the object comprises inputting the image frame and the audio frame into the artificial intelligence model.

4. The method for controlling an electronic device of claim 3, further comprising:
matching the information about the object with the image frame in which the object appeared, and storing the information about the object and the image frame.

5. The method for controlling an electronic device of claim 1, further comprising:
determining information corresponding to a user's voice instruction among the information about the object, and
wherein the providing comprises transmitting the determined information corresponding to the user's voice instruction to an external search server and providing the search result received from the external search server.

6. The method for controlling an electronic device of claim 5, wherein the determining further comprises:
displaying a user interface (UI) identifying whether the information about the object is information corresponding to the user's voice instruction, or identifying whether there is an additional inquiry for inquiring additional information.

7. The method for controlling an electronic device of claim 1, wherein the providing comprises:
providing the search result and a frame corresponding to the search result in an area of the video while the video is being displayed.

8. The method for controlling an electronic device of claim 1, comprising:
transmitting the plurality of second frames to an external server for acquiring information about frames; and
acquiring information about the plurality of second frames from the external server.

9. The method for controlling an electronic device of claim 8, wherein the external server recognizes a fingerprint included in the plurality of second frames.

10. The method of claim 1, wherein the providing includes transmitting the keyword to an external search server, and receiving the search result from the external search server based on the keyword.

11. The method of claim 1, wherein the predetermined amount of time comprises ten seconds prior to the time point when the user voice input is started to be received.

12. The method of claim 1, wherein the plurality of second frames comprises a plurality of image frames and a plurality of audio frames.

13. The method of claim 1, wherein the search result is provided in the video that is currently being displayed, and
wherein the providing comprises providing an indicator on the object corresponding to the search result in the video that is currently being displayed.

14. An electronic device comprising:
a display;
a communicator;
a microphone;
a memory storing at least one instruction; and
a processor coupled to the display, the communicator, the microphone and the memory, and controlling the electronic device,
wherein the processor is configured to execute the at least one instruction to:
control the electronic device to store in the memory a plurality of frames of a video for a first time period while displaying the video on the display,
receiving a user voice input of a user while a first frame of the video is being displayed, the user voice input comprising a request for information about an object displayed in the video,
based on the user voice input comprising the request for information about the object being received:
select a plurality of second frames based on a time point at which the user voice input is received, wherein the plurality of second frames are included in the stored plurality of frames, and the plurality of second frames were displayed by the electronic device during a second time period that is a predetermined amount of time prior to the time point when the user voice input is started to be received, obtain the information about the object based on a result of inputting the plurality of second frames into an artificial intelligence model trained through an artificial intelligence algorithm, wherein the information about the object comprises identification information of the object, position information of the object and size information of the object;

acquire a keyword corresponding to the object based on the identification information of the object, the position information of the object, the size information of the object and the user voice input, and provide a search result based on the keyword.

15. The electronic device of claim 14, wherein the user voice input comprises a trigger voice for initiating an inquiry for the information about the object included in the plurality of second frames and an inquiry voice for the information about the object, and the processor is further configured to execute the at least one instruction to input the plurality of second frames into the artificial intelligence model based on the time point when the user voice input is received.

16. The electronic device of claim 14, wherein the plurality of second frames comprises an image frame and an audio frame, and the processor is further configured to execute the at least one instruction to input the image frame and the audio frame into the artificial intelligence model.

17. The electronic device of claim 16, wherein the processor is further configured to execute the at least one instruction to:

match the information about the object with the image frame in which the object appeared, and store the information about the object and the image frame in the memory.

18. The electronic device of claim 14, wherein the processor is further configured to execute the at least one instruction to:

determine information corresponding to a user's voice instruction among the information on the object, transmit the determined information corresponding to the user's voice instruction to an external search server through the communicator, and provide the search result received from the external search server.

19. The electronic device of claim 18, wherein the processor is further configured to execute the at least one instruction to control the display to display a user interface (UI) identifying whether the information about the object is information corresponding to the user's voice instruction, or identifying whether there is an additional inquiry for inquiring additional information.

20. The electronic device of claim 14, wherein the processor is further configured to execute the at least one instruction to provide the search result and a frame corresponding to the search result in an area of the video while the video is being displayed.

21. The electronic device of claim 14, wherein the processor is further configured to execute the at least one instruction to:

control the communicator to transmit the plurality of second frames to an external server for acquiring information about frames, and acquire information about the plurality of second frames from the external server.

22. The electronic device of claim 21, wherein the external server recognizes a fingerprint included in the plurality of second frames.

* * * * *